US011742490B2

(12) United States Patent
Horiuchi et al.

(10) Patent No.: US 11,742,490 B2
(45) Date of Patent: Aug. 29, 2023

(54) POSITIVE ELECTRODE, BATTERY, BATTERY PACK, ELECTRONIC DEVICE, ELECTRIC MOTOR VEHICLE, POWER STORAGE DEVICE, AND POWER SYSTEM

(71) Applicant: MURATA MANUFACTURING CO., LTD., Kyoto (JP)

(72) Inventors: Hiroshi Horiuchi, Kyoto (JP); Nobuyuki Iwane, Kyoto (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 63 days.

(21) Appl. No.: 16/570,716

(22) Filed: Sep. 13, 2019

(65) Prior Publication Data
US 2020/0006774 A1 Jan. 2, 2020

Related U.S. Application Data

(63) Continuation of application No. PCT/JP2017/041346, filed on Nov. 16, 2017.

(30) Foreign Application Priority Data

Mar. 14, 2017 (JP) ................. 2017-049041

(51) Int. Cl.
| | |
|---|---|
| *H01M 4/62* | (2006.01) |
| *H01M 4/134* | (2010.01) |
| *H01M 50/46* | (2021.01) |
| *H01M 50/434* | (2021.01) |
| *H01M 50/426* | (2021.01) |
| *H01M 50/451* | (2021.01) |
| *H01M 4/86* | (2006.01) |
| *H01M 50/105* | (2021.01) |
| *H01M 50/417* | (2021.01) |

(52) U.S. Cl.
CPC ......... *H01M 4/623* (2013.01); *H01M 4/134* (2013.01); *H01M 50/426* (2021.01); *H01M 50/434* (2021.01); *H01M 50/451* (2021.01); *H01M 50/46* (2021.01); *H01M 50/105* (2021.01); *H01M 50/417* (2021.01); *H01M 2004/8689* (2013.01)

(58) Field of Classification Search
None
See application file for complete search history.

(56) References Cited

U.S. PATENT DOCUMENTS

| | | | | |
|---|---|---|---|---|
| 7,846,584 B2 * | 12/2010 | Choi | ...................... | H01M 4/131 429/218.1 |
| 2001/0004504 A1 * | 6/2001 | Nakamizo | ................ | H01M 4/62 429/137 |
| 2005/0253553 A1 * | 11/2005 | Phillips | .................. | H01M 50/24 320/112 |
| 2005/0274000 A1 * | 12/2005 | Oh | ....................... | H01M 10/058 429/300 |
| 2006/0088762 A1 | 4/2006 | Okamoto | | |
| 2007/0190408 A1 * | 8/2007 | Inoue | .................. | H01M 50/431 429/145 |
| 2011/0033754 A1 * | 2/2011 | Shimizu | ................ | H01M 4/133 429/231.95 |
| 2011/0117441 A1 | 5/2011 | Cheong et al. | | |
| 2013/0224556 A1 * | 8/2013 | Hong | ................... | H01M 50/457 429/144 |
| 2015/0044574 A1 * | 2/2015 | Cakmak | ................ | H01M 50/42 29/623.5 |
| 2015/0255781 A1 * | 9/2015 | Hashimoto | ............ | H01G 11/06 429/188 |
| 2016/0211554 A1 | 7/2016 | Umeyama et al. | | |
| 2017/0207444 A1 * | 7/2017 | Yanagihara | ....... | H01M 10/0568 |
| 2021/0043941 A1 * | 2/2021 | Horiuchi | ........... | H01M 10/0587 |

FOREIGN PATENT DOCUMENTS

| | | | |
|---|---|---|---|
| CN | 105811021 | | 7/2016 |
| EP | 2 448 055 | * | 5/2012 |
| JP | 2001-266942 | | 9/2001 |
| JP | 2001266942 | A | 9/2001 |
| JP | 2002-270180 | | 9/2002 |
| JP | 2004021651 | A | 1/2004 |
| JP | 2004021652 | A | 1/2004 |
| JP | 2004053763 | A | 2/2004 |
| JP | 2006-120462 | | 5/2006 |
| JP | 2006120462 | A | 5/2006 |
| JP | 2010-080188 | * | 4/2010 |
| JP | 2011-108619 | | 6/2011 |
| JP | 2011108619 | A | 6/2011 |

(Continued)

OTHER PUBLICATIONS

Machine translation of JP 2016-189300, published on Nov. 4, 2016 (Year: 2016).*
Machine translation of JP 2010-080188, published on Apr. 8, 2010 (Year: 2010).*
Japanese Office Action dated Apr. 21, 2020 in corresponding Japanese Application No. 2017-049041.
International Search Report for Application No. PCT/JP2017/041346, dated Jan. 9, 2018.
Chinese Office Action dated Feb. 14, 2022 in corresponding Chinese Application No. 201780088413.1.

*Primary Examiner* — Anca Eoff
(74) *Attorney, Agent, or Firm* — K&L Gates LLP

(57) ABSTRACT

A battery includes a positive electrode; a negative electrode; a separator; and an intermediate layer. The intermediate layer is provided between the positive electrode and the separator and includes one or both of a fluororesin and a particle. The positive electrode has a positive electrode active material layer including a fluorine-based binder having a melting point of 166° C. or less, and a content of the fluorine-based binder in the positive electrode active material layer is from 0.5% by mass to 2.8% by mass.

14 Claims, 5 Drawing Sheets

(56) References Cited

FOREIGN PATENT DOCUMENTS

| | | | |
|---|---|---|---|
| JP | 2015-232923 | | 12/2015 |
| JP | 2015232923 | A | 12/2015 |
| JP | 2016-134237 | | 7/2016 |
| JP | 2016134237 | A | 7/2016 |
| JP | 2016-189300 | * | 11/2016 |
| WO | 2011/114626 | | 9/2011 |
| WO | 2011114626 | A1 | 9/2011 |
| WO | WO 2016/017077 | * | 2/2016 |

* cited by examiner

POSITIVE ELECTRODE, BATTERY, BATTERY PACK, ELECTRONIC DEVICE, ELECTRIC MOTOR VEHICLE, POWER STORAGE DEVICE, AND POWER SYSTEM

CROSS REFERENCE TO RELATED APPLICATIONS

The present application is a continuation of PCT patent application no. PCT/JP2017/041346, filed on Nov. 16, 2017, which claims priority to Japanese patent application no. JP2017-049041 filed on Mar. 14, 2017, the entire contents of which are being incorporated herein by reference.

BACKGROUND

The present technology generally relates to a positive electrode, a battery, a battery pack, an electronic device, an electric motor vehicle, a power storage device, and a power system.

In recent years, a battery has been widely used as a power supply for a mobile phone, a laptop computer, an electric tool, an electric car, and the like. Since battery characteristics largely depend on electrodes, an electrolyte, and a separator used in the battery, various technologies have been suggested for these members.

SUMMARY

The present technology generally relates to a positive electrode, a battery, a battery pack, an electronic device, an electric motor vehicle, a power storage device, and a power system.

An object of the present technology is to provide a positive electrode, a battery, a battery pack, an electronic device, an electric motor vehicle, a power storage device, and a power system capable of suppressing gas generation and improving safety.

According to an embodiment of the present technology, a battery of the present technology is provided. The battery includes a positive electrode; a negative electrode; a separator; and an intermediate layer that is provided between the positive electrode and the separator and includes one or both of a fluororesin and a particle, in which the positive electrode has a positive electrode active material layer including a fluorine-based binder having a melting point of 166° C. or less, and a content of the fluorine-based binder in the positive electrode active material layer is from 0.5% by mass to 2.8% by mass.

According to an embodiment of the present technology, a positive electrode of the present technology is provided. The positive electrode includes a positive electrode active material layer including a fluorine-based binder having a melting point of 166° C. or less; and a surface layer that is provided on a surface of the positive electrode active material layer and includes one or both of a fluororesin and a particle, in which a content of the fluorine-based binder in the positive electrode active material layer is from 0.5% by mass to 2.8% by mass.

According to an embodiment of the present technology, a battery pack, an electronic device, an electric motor vehicle, a power storage device, and a power system of the present technology include the battery as described herein.

According to an embodiment of the present technology, the intermediate layer may be a surface layer including one or both of a fluororesin and a particle and provided on a surface of the positive electrode or may be a surface layer including one or both of a fluororesin and a particle and provided on a surface of the separator. The fluororesin included in the surface layer is configured to hold an electrolytic solution. The fluororesin holding the electrolytic solution may be in a gel state.

According to an embodiment of the present technology, in a case where the intermediate layer includes the particle, the particle may exist in a state in which it is supported by one or both of the positive electrode and the separator.

According to an embodiment of the present technology, the intermediate layer may be a layer in which one or both of the fluororesin and the particle are provided continuously between the positive electrode and the separator or may be a layer in which one or both of the fluororesin and the particle are provided discontinuously (for example, in a spot shape or an island shape) between the positive electrode and the separator.

According to the present technology, gas generation can be suppressed and safety can be improved.

It should be understood that an effect described here is not necessarily limited, and other suitable properties relating to the present technology may be realized and as further described.

DETAILED DESCRIPTION

As described herein, the present disclosure will be described based on examples with reference to the drawings, but the present disclosure is not to be considered limited to the examples, and various numerical values and materials in the examples are considered by way of example.

Figure 1:
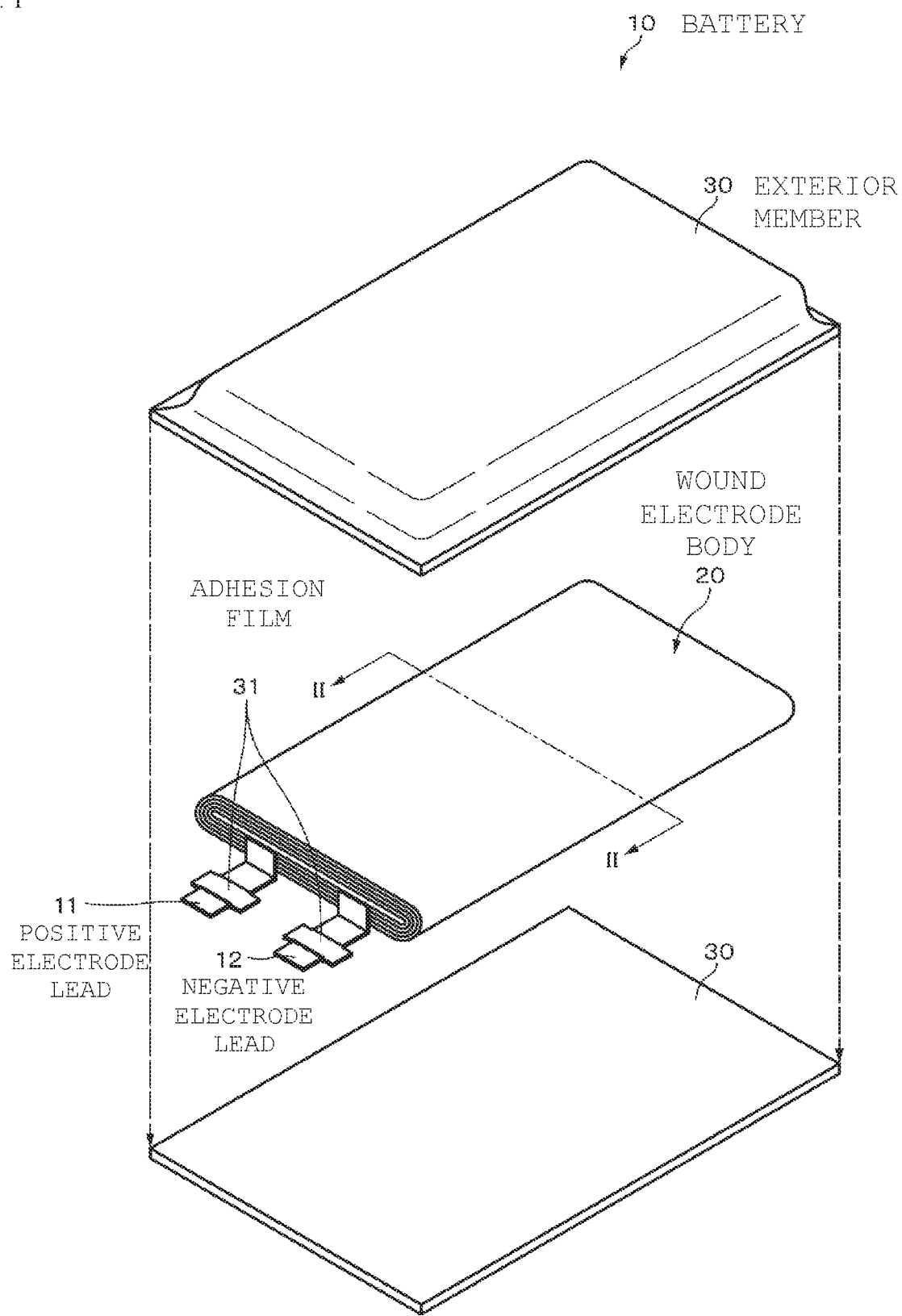
FIG. 1 is an exploded perspective view illustrating an example of a configuration of a non-aqueous electrolyte secondary battery according to an embodiment of the present technology.

As illustrated in FIG. 1, a non-aqueous electrolyte secondary battery (hereinafter, simply referred to as a "battery") 10 according to an embodiment of the present technology is a so-called laminate film type battery, and has a structure in which a flat wound electrode body 20 to which a positive electrode lead 11 and a negative electrode lead 12 are attached is accommodated in exterior members 30 having a film shape, so that miniaturization, weight reduction, and thickness reduction of the battery can be implemented.

The positive electrode lead 11 and the negative electrode lead 12 are led from the inside of the exterior members 30 toward the outside of the exterior members 30 in, for example, the same direction. The positive electrode lead 11 and the negative electrode lead 12 are formed of, for example, a metal material such as aluminum (Al), copper (Cu), nickel (Ni), stainless steel, or the like, and have a thin plate shape or a mesh shape.

The exterior member 30 is formed of, for example, a flexible laminate film. The exterior member 30 has, for example, a configuration in which a thermal fusion resin layer, a metal layer, and a surface protective layer are sequentially laminated. Note that a surface of the thermal fusion resin layer side becomes a surface accommodating the wound electrode body 20. Examples of a material of the thermal fusion resin layer can include polypropylene (PP) and polyethylene (PE). Examples of a material of the metal layer can include aluminum. Examples of a material of the surface protective layer can include nylon (Ny). Specifically, for example, the exterior member 30 is formed of, for example, a rectangular aluminum laminate film in which a nylon film, an aluminum foil, and a polyethylene film are sequentially stuck to one another. The exterior member 30 is disposed, for example, such that the thermal fusion resin layer and the wound electrode body 20 face each other, and the respective outer edge portions are in close contact with each other by fusion or an adhesive. Adhesion films 31 for preventing entrance of the outside air are inserted between the exterior member 30 and the positive electrode lead 11, and between the exterior member 30 and the negative electrode lead 12. The adhesion films 31 are formed of a material having an adhesion property to the positive electrode lead 11 and the negative electrode lead 12, for example, a polyolefin resin such as polyethylene, polypropylene, modified polyethylene, modified polypropylene, or the like.

It should be understood that the exterior member 30 may be formed of a laminate film having another structure, a polymer film such as polypropylene or the like, or a metal film, instead of the laminate film described above. Alternatively, a laminate film in which a polymer film is laminated on one surface or both surfaces of an aluminum film using the aluminum film as a core material may be used.

Further, in terms of beauty of an appearance, a member further including a colored layer, and/or a member containing a coloring material in at least one layer selected from a thermal fusion resin layer and a surface protective layer may be used as the exterior member 30. In a case where an adhesive layer is provided at least between the thermal fusion resin layer and the metal layer or between the surface protective layer and the metal layer, the adhesive layer may contain a coloring material.

Figure 2:
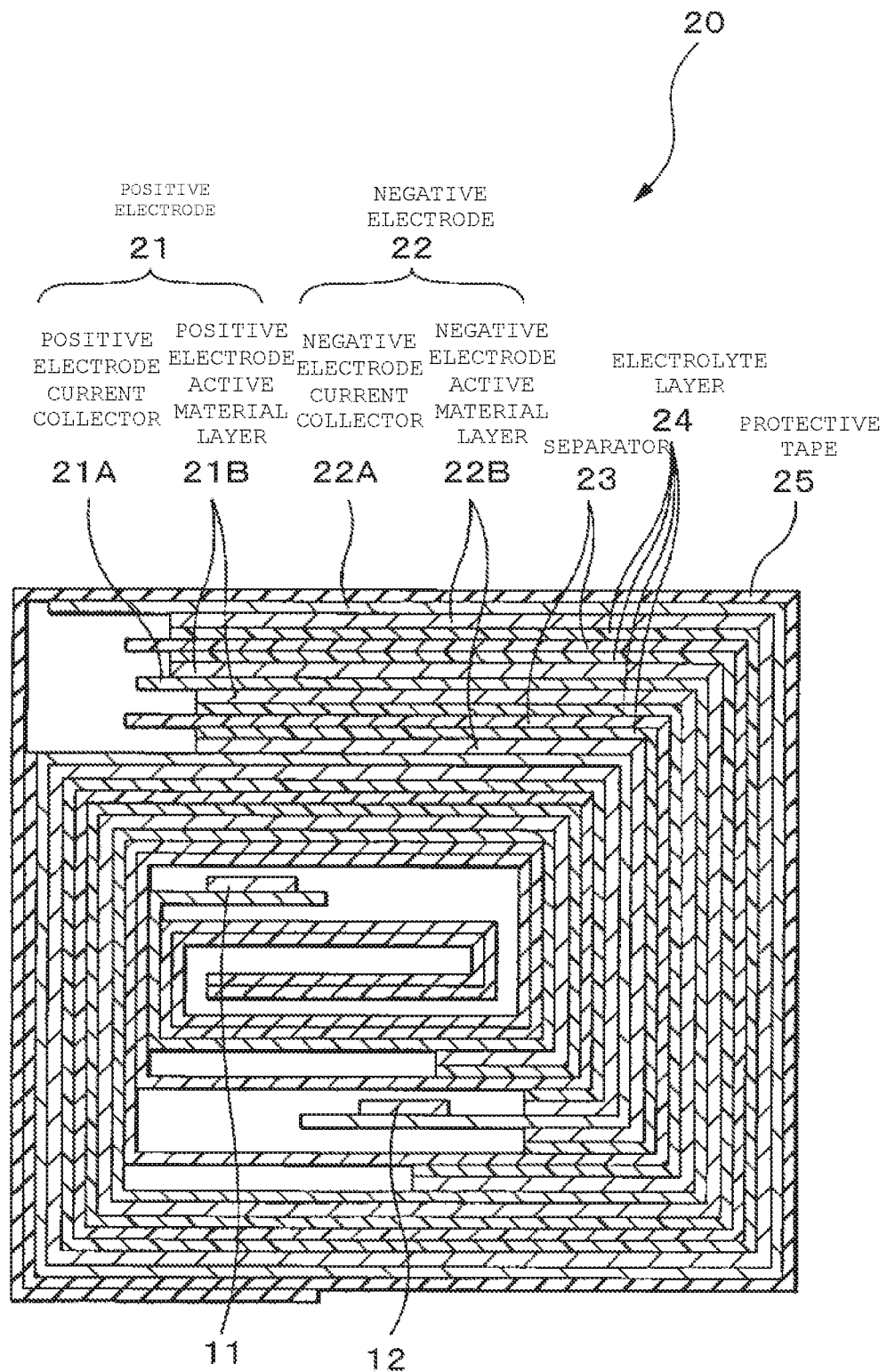
FIG. 2 is a cross-sectional view taken along line II-II in FIG. 1.

As illustrated in FIG. 2, the wound electrode body 20 as a battery element is formed by laminating a long positive electrode 21 and a long negative electrode 22 with long separators 23 and long electrolyte layers 24 interposed therebetween and winding the positive electrode 21 and the negative electrode 22 in a flat shape and a spiral shape, and the outermost peripheral portion is protected by a protective tape 25.

Hereinafter, the positive electrode 21, the negative electrode 22, the separator 23, and the electrolyte layer 24 constituting the battery will be sequentially described.

The positive electrode 21 has a structure in which a positive electrode active material layer 21B is provided on one surface or both surfaces of a positive electrode current collector 21A. Note that although not illustrated, the positive electrode active material layer 21B may be provided only on one surface of the positive electrode current collector 21A. The positive electrode current collector 21A is formed of, for example, a metal foil such as an aluminum foil, a nickel foil, a stainless steel foil, or the like. The positive electrode active material layer 21B contains, for example, a positive electrode active material capable of storing and releasing lithium, which is an electrode reactant, and a binder. The positive electrode active material layer 21B may further contain a conductive agent, if necessary.

As the positive electrode active material capable of storing and releasing lithium, for example, a lithium-containing compound such as lithium oxide, lithium phosphorus oxide, lithium sulfide, an intercalation compound containing lithium, or the like, is suitable, and a mixture of two or more of them may be used. In order to increase an energy density, a lithium-containing compound containing lithium, a transition metal element, and oxygen (O) is preferable. Examples of such a lithium-containing compound can include a lithium composite oxide having a layered rock salt type structure represented in Formula (A), a lithium composite phosphate having an olivine type structure represented in Formula (B), and the like. It is more preferable that the lithium-containing compound contains at least one selected from the group consisting of cobalt (Co), nickel, manganese (Mn), and iron (Fe) as the transition metal element. Examples of such a lithium-containing compound can include a lithium composite oxide having a layered rock salt type structure represented in Formula (C), Formula (D) or Formula (E), a lithium composite oxide having a spinel type structure represented in Formula (F), or a lithium complex phosphate having an olivine type structure represented in Formula (G), and the like, specifically, $LiNi_{0.50}Co_{0.20}Mn_{0.30}O_2$, $LiaCoO_2$ (a≈1), $Li_bNiO_2$ (b≈1), $Li_{c1}Ni_{c2}Co_{1-c2}O_2$ (c1≈1 and 0<c2<1), $Li_dMn_2O_4$ (d≈1), or $Li_eFePO_4$ (e≈1).

$$Li_pNi_{(1-q-r)}Mn_qM1_rO_{(2-y)}X_z \quad (A)$$

(In Formula (A), M1 represents at least one of elements selected from Groups 2 to 15 excluding nickel and manganese. X represents at least one of Group 16 elements and Group 17 elements other than oxygen. p, q, y, z are values within ranges in which 0≤p≤1.5, 0≤q≤1.0, 0≤r≤1.0, −0.10≤y≤0.20, and 0≤z≤0.2.)

$$Li_aM2_bPO_4 \quad (B)$$

(In Formula (B), M2 represents at least one of elements selected from Groups 2 to 15. a and b are values within ranges in which 0≤a≤2.0 and 0.5≤b≤2.0.)

$$Li_jMn_{(1-g-h)}Ni_gM3_hO_{(2-j)}F_k \quad (C)$$

(In formula (C), M3 represents at least one selected from the group consisting of cobalt, magnesium (Mg), aluminum, boron (B), titanium (Ti), vanadium (V), chromium (Cr), iron, copper, zinc (Zn), zirconium (Zr), molybdenum (Mo), tin (Sn), calcium (Ca), strontium (Sr), and tungsten (W). f, g, h, j and k are values within ranges in which 0.8≤f≤1.2, 0<g<0.5, 0≤h≤0.5, g+h<1, −0.1≤j≤0, and 2, 0≤k≤0.1. Note that the composition of lithium differs depending on charged and discharged states, and a value of f represents a value in a fully discharged state.)

$$Li_mNi_{(1-n)}M4_nO_{(2-p)}F_q \quad (D)$$

(In formula (D), M4 represents at least one selected from the group consisting of cobalt, manganese, magnesium, aluminum, boron, titanium, vanadium, chromium, iron, copper, zinc, molybdenum, tin, calcium, strontium, and tungsten. m, n, p and q are values within ranges in which 0.8≤m≤1.2, $0.005 \leq n \leq 0.5$, $-0.1 \leq p \leq 0.2$, and $0 \leq q \leq 0.1$. Note that the composition of lithium differs depending on charged and discharged states, and a value of m represents a value in a fully discharged state.)

$$Li_rCo_{(1-s)}M5_sO_{(2-t)}F_u \qquad (E)$$

(In formula (E), M5 represents at least one selected from the group consisting of nickel, manganese, magnesium, aluminum, boron, titanium, vanadium, chromium, iron, copper, zinc, molybdenum, tin, calcium, strontium, and tungsten. r, s, t and u are values within ranges in which $0.8 \leq r \leq 1$, $2.0 \leq s \leq 0.5$, $-0.1 \leq t \leq 0.2$, and $0 \leq u \leq 0.1$. Note that the composition of lithium differs depending on charged and discharged states, and a value of r represents a value in a fully discharged state.)

$$Li_vMn_{2-w}M6_wO_xF_y \qquad (F)$$

(In formula (F), M6 represents at least one selected from the group consisting of cobalt, nickel, magnesium, aluminum, boron, titanium, vanadium, chromium, iron, copper, zinc, molybdenum, tin, calcium, strontium, and tungsten. v, w, x and y are values within ranges in which $0.9 \leq v \leq 1$, $1.0 \leq w \leq 0.6$, $3.7 \leq x \leq 4.1$, and $1.0 \leq y \leq 0.1$. Note that the composition of lithium differs depending on charged and discharged states, and a value of v represents a value in a fully discharged state.)

$$Li_zM7PO_4 \qquad (G)$$

(In formula (G), M7 represents at least one selected from the group consisting of cobalt, manganese, iron, nickel, magnesium, aluminum, boron, titanium, vanadium, niobium (Nb), copper, zinc, molybdenum, calcium, strontium, tungsten, and zirconium. z is a value within a range in which $0.9 \leq z \leq 1.1$. Note that the composition of lithium differs depending on charged and discharged states, and a value of z represents a value in a fully discharged state.)

Examples of the positive electrode active material capable of storing and releasing lithium can include inorganic compounds that do not contain lithium, such as $MnO_2$, $V_2O_5$, $V_6O_{13}$, NiS, MoS, and the like, in addition to the materials described above.

The positive electrode active material capable of storing and releasing lithium may be a material other than those described above. Further, two or more types of positive electrode active materials exemplified above may be mixed with each other in any combination.

The binder contains a fluorine-based binder having a melting point of 166° C. or less. In a case where the melting point of the fluorine-based binder is 166° C. or less, affinity between the fluorine-based binder and the positive electrode active material particles is improved, and the positive electrode active material particles can be covered well with the fluorine-based binder, so that a reaction between the positive electrode active material particles and an electrolytic solution can be suppressed. Therefore, swelling of the battery 10 due to gas generation can be suppressed. Further, since thermal stability of the positive electrode 21 can be improved by covering the positive electrode active material particles well with the fluorine-based binder, it is also possible to improve safety of the battery (for example, short-circuit system safety evaluated by a nailing test or heating system safety evaluated by a heating test). A lower limit value of the melting point of the fluorine-based binder is not particularly limited, and is, for example, 150° C. or more.

The melting point of the fluorine-based binder is measured, for example, as follows. First, a positive electrode mixture (the positive electrode active material, the binder and the like) constituting the positive electrode active material layer 21B is taken out and is sufficiently stirred in N-methyl-2-pyrrolidone (NMP) to dissolve the binder in NMP. Next, an undissolved portion of the positive electrode mixture is removed, NMP is evaporated and dried, and the melting point of the binder is measured by performing differential scanning calorimetry (DSC) on a precipitated resin component.

The fluorine-based binder is polyvinylidene fluoride (PVdF). As the polyvinylidene fluoride, a homopolymer containing vinylidene fluoride (VdF) as a monomer is used. A copolymer containing vinylidene fluoride (VdF) as a monomer is easily swollen and dissolved in an electrolytic solution, and has a weak binding capability. Therefore, when the copolymer described above is used as the binder, there is a possibility that characteristics of the positive electrode 21 are deteriorated. As the polyvinylidene fluoride, polyvinylidene fluoride in which part of a terminal or the like is modified with a carboxylic acid such as a maleic acid or the like may be used.

A content of the fluorine-based binder in the positive electrode active material layer 21B is 0.5% by mass or more and 2.8% by mass or less, and preferably 0.7% by mass or more and 2.8% by mass or less. When the content of the fluorine-based binder is less than 0.5% by mass, binding between the positive electrode active material particles and binding between the positive electrode active material particles and the positive electrode current collector 21A is insufficient, so that there is a possibility that the positive electrode active material layer 21B will fall off from the positive electrode current collector 21A when the positive electrode 21 is wound in the flat shape. Further, the covering of the positive electrode active material particles with the fluorine-based binder is insufficient, so that there is a possibility that it is difficult to suppress the swelling of the battery 10 and the safety of the battery is reduced. On the other hand, when the content of the fluorine-based binder exceeds 2.8% by mass, flexibility of the positive electrode active material layer 21B is reduced, so that there is a possibility that a crack occurs in the positive electrode active material layer 21B when the positive electrode 21 is wound in the flat shape.

The content of the fluorine-based binder described above can be calculated, for example, as follows. In other words, it is possible to calculate the content of the fluorine-based binder in the positive electrode active material layer 21B from a reduced weight by performing thermogravimetry (TG) of the positive electrode mixture (the positive electrode active material, the fluorine-based binder, and the like) constituting the positive electrode active material layer 21B.

Examples of the conductive agent can include a carbon material such as graphite, carbon fiber, carbon black, Ketjen black, a carbon nanotube, and the like, and one of these materials may be used alone or used in combination of two or more of these materials. Further, in addition to the carbon material, a metal material, a conductive polymer material or the like may be used as long as it has conductivity.

A content of the conductive agent in the positive electrode active material layer 21B is preferably 0.3% by mass or more and 2.8% by mass or less, and more preferably, 0.5% by mass or more and 2.8% by mass or less. When the content of the conductive agent is 0.3% by mass or more, gas absorbing ability of the conductive agent is improved, so that the swelling of the battery 10 can be further suppressed. Further, the flexibility of the positive electrode active material layer 21B is improved, so that it is possible to suppress a crack from occurring in the positive electrode active material layer 21B when the positive electrode 21 is wound in the flat shape. Meanwhile, when the content of the conductive agent is 2.8% by mass or less, an amount of the binder adsorbed to the conductive agent is suppressed, so that it is possible to suppress the positive electrode active material layer 21B from falling off from the positive electrode current collector 21A when the positive electrode 21 is wound in the flat shape.

The content of the conductive agent described above can be calculated, for example, as follows. In other words, it is possible to calculate the content of the conductive agent in the positive electrode active material layer 21B from a reduced weight by performing thermogravimetry (TG) of the positive electrode mixture (the positive electrode active material, the binder, the conductive agent, and the like) constituting the positive electrode active material layer 21B.

The negative electrode 22 has a structure in which a negative electrode active material layer 22B is provided on one surface or both surfaces of a negative electrode current collector 22A, and the negative electrode active material layer 22B and the positive electrode active material layer 21B are disposed to face each other. Note that although not illustrated, the negative electrode active material layer 22B may be provided only on one surface of the negative electrode current collector 22A. The negative electrode current collector 22A is formed of, for example, a metal foil such as a copper foil, a nickel foil, a stainless steel foil, or the like.

The negative electrode active material layer 22B contains one or two or more negative electrode active materials capable of storing and releasing lithium. The negative electrode active material layer 22B may further contain an additive such as a binder, a conductive agent or the like, if necessary.

It should be understood that, in this non-aqueous electrolyte battery, an electrochemical equivalent of the negative electrode 22 or the negative electrode active material is larger than that of the positive electrode 21, and it is theoretically preferable that a lithium metal is not deposited on the negative electrode 22 during charging.

Examples of the negative electrode active material can include carbon materials such as hardly-graphitizable carbon, easily-graphitizable carbon, graphite, pyrolytic carbons, cokes, glassy carbons, organic polymer compound fired bodies, carbon fiber, activated carbon, and the like. Among them, cokes include pitch coke, needle coke, and petroleum coke. The organic polymer compound fired bodies refer to materials obtained by firing and carbonizing a polymer material such as a phenol resin, a furan resin or the like at an appropriate temperature, and some of the organic polymer compound fired bodies are classified into hardly-graphitizable carbon or easily-graphitizable carbon. These carbon materials are preferable since a change in a crystal structure occurring at the time of charging and discharging is very small, a high charging and discharging capacity can be obtained, and good cycle characteristics can be obtained. In particular, graphite is preferable since an electrochemical equivalent is large and a high energy density can be obtained. Further, hardly-graphitizable carbon is preferable since excellent cycle characteristics can be obtained. Furthermore, a material having a low charging and discharging potential, specifically, a material having a charging and discharging potential close to that of a lithium metal is preferable since a high energy density of the battery can be easily realized.

Further, examples of another negative electrode active material capable of increasing a capacity can include a material containing at least one of a metal element and a metalloid element as a constituent element (for example, an alloy, a compound, or a mixture). The reason is that a high energy density can be obtained when such a material is used. In particular, when such a material is used together with a carbon material, a high energy density can be obtained, and excellent cycle characteristics can be obtained, which is more preferable. Note that, in the present technology, an alloy includes an alloy containing one or more metal elements and one or more metalloid elements, in addition to an alloy containing two or more metal elements. Further, the alloy may contain a nonmetallic element. In a tissue of the alloy, a solid solution, a eutectic (eutectic mixture), an intermetallic compound, or a mixture of two or more thereof coexists.

Examples of such a negative electrode active material can include a metal element and a metalloid element capable of forming an alloy with lithium. Specifically, examples of such a negative electrode active material can include magnesium, boron, aluminum, titanium, gallium (Ga), indium (In), silicon (Si), germanium (Ge), tin, lead (Pb), bismuth (Bi), cadmium (Cd), silver (Ag), zinc, hafnium (Hf), zirconium, yttrium (Y), palladium (Pd), or platinum (Pt). These may be crystalline or amorphous.

The negative electrode active material preferably contains metal elements or metalloid elements of Group 4B in a short form of the periodic table as constituent elements, and more preferably contains at least one of silicon and tin as a constituent element. The reason is that silicon and tin have a large ability to store and release lithium and can obtain a high energy density. Examples of such a negative electrode active material can include a simple substance, an alloy and a compound of silicon, a simple substance, an alloy and a compound of tin, and a material having one or two or more phases of them in at least a part thereof.

Examples of the alloy of silicon can include alloys containing at least one selected from the group consisting of tin, nickel, copper, iron, cobalt, manganese, zinc, indium, silver, titanium, germanium, bismuth, antimony (Sb), and chromium as a second constituent element other than silicon. Examples of the alloy of tin can include alloys containing at least one selected from the group consisting of silicon, nickel, copper, iron, cobalt, manganese, zinc, indium, silver, titanium, germanium, bismuth, antimony, and chromium as a second constituent element other than tin.

Examples of the compound of tin or the compound of silicon can include compounds containing oxygen or carbon, and may contain the second constituent element described above, in addition to tin or silicon.

Among them, a Sn-based negative electrode active material is preferably a SnCoC-containing material which contains cobalt, tin, and carbon as constituent elements and in which a content of carbon is 9.9% by mass or more and 29.7% by mass or less, and a ratio of cobalt to a total of tin and cobalt is 30% by mass or more and 70% by mass or less. The reason is that it is possible to obtain a high energy density and excellent cycle characteristics in such a composition range.

This SnCoC-containing material may further contain other constituent elements, if necessary. The other constituent elements are preferably, for example, silicon, iron, nickel, chromium, indium, niobium, germanium, titanium, molybdenum, aluminum, phosphorus (P), gallium, or bismuth, and may contain two or more thereof. The reason is that a capacity or cycle characteristics can be further improved.

It should be understood that this SnCoC-containing material has a phase containing tin, cobalt, and carbon, and this phase preferably has a low crystalline or amorphous structure. Further, in this SnCoC-containing material, it is preferable that at least part of carbon, which is a constituent element, is bonded to a metal element or a metalloid element, which is another constituent element. The reason is that deterioration of the cycle characteristics is considered to be due to aggregation or crystallization of tin or the like, but such aggregation or crystallization can be suppressed by combining carbon with another element.

Examples of a measurement method for examining a bonding state of elements can include an X-ray photoelectron spectroscopy (XPS). In the XPS, a peak of 1s orbital of carbon (C1s) appears at 284.5 eV in an apparatus whose energy is calibrated so that a peak of 4f orbital of a gold atom (Au4f) is obtained at 84.0 eV, in a case of graphite. Further, in a case of surface contamination carbon, a peak of C1s appears at 284.8 eV. On the other hand, in a case where a charge density of a carbon element is high, for example, in a case where carbon is bonded to the metal element or the metalloid element, a peak of C1s appears in a region lower than 284.5 eV. In other words, in a case where a peak of a synthetic wave of C1s obtained for the SnCoC-containing material appears in the region lower than 284.5 eV, at least part of carbon contained in the SnCoC-containing material is bonded to the metal element or the metalloid element, which is another constituent element.

It should be understood that, in XPS measurement, for example, the peak of C1s is used for correction of an energy axis of a spectrum. Usually, the surface contaminating carbon is present on a surface, and the peak of C1s of the surface contaminating carbon is thus 284.8 eV, which is used as an energy standard. In the XPS measurement, a waveform of the peak of C1s is obtained as a form including a peak of the surface contaminating carbon and a peak of carbon the SnCoC-containing material. Therefore, the peak of the surface contamination carbon and the peak of carbon in the SnCoC-containing material are separated from each other, for example, by performing analysis using commercially available software. In the analysis of the waveform, a position of a main peak existing on the lowest binding energy side is used as an energy standard (284.8 eV).

Examples of other negative electrode active materials can include metal oxide and a polymer compound capable of storing and releasing lithium. Examples of the metal oxide can include lithium titanium oxide containing titanium and lithium, such as lithium titanate ($Li_4Ti_5O_{12}$) and the like, iron oxide, ruthenium oxide, molybdenum oxide, and the like. Examples of the polymer compound can include polyacetylene, polyaniline, polypyrrole, and the like.

As the binder, for example, at least one selected from resin materials such as polyvinylidene fluoride, polytetrafluoroethylene, polyacrylonitrile, styrene butadiene rubber, carboxymethylcellulose, and the like, copolymers containing these resin materials as main constituents, and the like, is used.

As the conductive agent, a carbon material similar to that of the positive electrode active material layer 21B can be used.

The separator 23 separates the positive electrode 21 and the negative electrode 22 from each other, and allows lithium ions to pass therethrough while preventing a short-circuit of a current caused by a contact between the positive electrode 21 and the negative electrode 22. The separator 23 includes, for example, a porous membrane formed of a resin such as polytetrafluoroethylene, polypropylene, polyethylene, or the like, and may have a structure in which two or more types of porous membranes are laminated. Among them, a porous membrane formed of polyolefin is preferable since it is excellent in a short-circuit preventing effect and can achieve improvement of safety of the battery by a shutdown effect. In particular, polyethylene is preferable as a material for forming the separator 23 since it can provides a shutdown effect in a range of 100° C. or more and 160° C. or less and is also excellent in electrochemical stability. Besides, it is possible to use a material in which a resin having chemical stability is copolymerized or blended with polyethylene or polypropylene. Alternatively, the porous membrane may have a structure of three or more layers in which a polypropylene layer, a polyethylene layer, and a polypropylene layer are sequentially laminated.

The electrolyte layer 24 is an example of an intermediate layer, and contains a non-aqueous electrolytic solution and a fluororesin as a polymer compound that is a holding body holding the non-aqueous electrolytic solution, and the fluororesin is swollen by the non-aqueous electrolytic solution. A content ratio of the fluororesin can be appropriately adjusted. The electrolyte layer 24 contains the fluororesin, so that an adhesion property between the positive electrode active material layer 21B containing the fluorine-based binder having a melting point of 166° C. or less and the separator 23 can be enhanced. The electrolyte layer 24 is preferably a gel electrolyte layer. The reason is that when the electrolyte layer 24 is a gel electrolyte layer, a high ion conductivity can be obtained and leakage of the battery 10 can be particularly suppressed.

The electrolytic solution contains a solvent and an electrolyte salt dissolved in the solvent. The electrolytic solution may contain known additives in order to improve battery characteristics.

A cyclic carbonic acid ester such as ethylene carbonate, propylene carbonate or the like can be used as the solvent, and it is preferable to use one of ethylene carbonate and propylene carbonate, particularly, a mixture of ethylene carbonate and propylene carbonate as the solvent. The reason is that cycle characteristics can be improved.

Further, it is preferable to use a mixture of chained carbonic acid ester such as diethyl carbonate, dimethyl carbonate, ethyl methyl carbonate, methyl propyl carbonate or the like, in addition to the cyclic carbonic acid ester as the solvent. The reason is that high ion conductivity can be obtained.

Furthermore, it is preferable that the solvent contains 2,4-difluoroanisole or vinylene carbonate. The reason is that 2,4-difluoroanisole can improve a discharging capacity and vinylene carbonate can improve cycle characteristics. Therefore, it is preferable to use a mixture of 2,4-difluoroanisole and vinylene carbonate since the discharging capacity and the cycle characteristics can be improved.

In addition to the solvents described above, examples of the solvent can include butylene carbonate, γ-butyrolactone, γ-valerolactone, 1,2-dimethoxyethane, tetrahydrofuran, 2-methyltetrahydrofuran, 1,3-dioxolane, 4-methyl-1,3-dioxolane, methyl acetate, methyl propionate, acetonitrile, glutaronitrile, adiponitrile, methoxyacetonitrile, 3-methoxypropionitrile, N,N-dimethylformamide, N-methylpyrrolidinone, N-methyloxazolidinone, N,N-dimethylimidazolidinone, nitromethane, nitroethane, sulfolane, dimethyl sulfoxide, trimethyl phosphate, and the like.

It should be understood that since a compound in which hydrogen of at least part of these non-aqueous solvents is substituted by fluorine may improve reversibility of an electrode reaction depending on a type of electrode to be combined, which is may be preferable.

Examples of the electrolyte salt can include lithium salts, and one type of lithium salt may be used alone, or a mixture of two or more types of lithium salts may be used. Examples of the lithium salts can include $LiPF_6$, $LiBF_4$, $LiAsF_6$, $LiClO_4$, $LiB(C_6H_5)_4$, $LiCH_3SO_3$, $LiCF_3SO_3$, $LiN(SO_2CF_3)_2$, $LiC(SO_2CF_3)_3$, $LiAlCl_4$, $LiSiF_6$, $LiSi$, $LiCl$, difluoro[oxolat-O,O']lithium borate, lithium bis(oxalate) borate, $LiBr$, and the like. Among them, $LiPF_6$ is preferable since it can obtain high ion conductivity and can improve cycle characteristics.

The fluororesin as the polymer compound contains, for example, at least one of polyvinylidene fluoride, a copolymer of vinylidene fluoride and hexafluoropropylene, polytetrafluoroethylene, and polyhexafluoropropylene. In particular, in view of electrochemical stability, it is preferable that the fluororesin contains at least one of polyvinylidene fluoride and polyhexafluoropropylene.

In the battery according to the embodiment, an open circuit voltage (that is, a battery voltage) in a fully charged state per pair of positive electrode 21 and negative electrode 22 may be 4.2 V or less, but may be designed to be preferably 4.25 V or more, more preferably 4.3 V or more, and still more preferably 4.4V or more. By raising the battery voltage, a high energy density can be obtained. An upper limit of the open circuit voltage in the fully charged state per pair of positive electrode 21 and negative electrode 22 is preferably 6.00 V or less, more preferably 4.60 V or less, and still more preferably 4.50 V or less.

In the battery having the configuration described above, when the battery is charged, for example, lithium ions are released from the positive electrode active material layer 21B and are stored in the negative electrode active material layer 22B through the electrolytic solution. Further, when the battery is discharged, for example, lithium ions are released from the negative electrode active material layer 22B and are stored in the positive electrode active material layer 21B through the electrolytic solution.

Next, an example of a method of producing a battery according to an embodiment of the present technology will be described.

The positive electrode 21 is manufactured as follows. First, for example, a positive electrode active material, a conductive agent, and a binder are mixed with one another to prepare a positive electrode mixture, and the positive electrode mixture is dispersed in a solvent such as N-methyl-2-pyrrolidone (NMP) or the like to prepare a paste-like positive electrode mixture slurry. Next, the positive electrode mixture slurry is coated on the positive electrode current collector 21A, the solvent is dried, and the positive electrode active material layer 21B is formed by compression molding using a roll press machine or the like to form the positive electrode 21.

The negative electrode 22 is manufactured as follows. First, for example, a negative electrode active material and a binder are mixed with each other to prepare a negative electrode mixture, and the negative electrode mixture is dispersed in a solvent such as N-methyl-2-pyrrolidone (NMP) or the like to prepare a paste-like negative electrode mixture slurry. Next, the negative electrode mixture slurry is coated on the negative electrode current collector 22A, the solvent is dried, and the negative electrode active material layer 22B is formed by compression molding using a roll press machine or the like to form the negative electrode 22.

The electrolyte layer 24 is manufactured as follows. First, an electrolyte solution containing a matrix polymer, an electrolytic solution, and a dilution solvent is prepared. Next, the electrolyte solution is uniformly coated on and impregnated into each of the positive electrode 21 and the negative electrode 22 obtained as described above. Thereafter, the dilution solvent is vaporized and removed to form the electrolyte layer 24.

The wound electrode body 20 is manufactured as follows. First, the positive electrode lead 11 is attached to an end of the positive electrode current collector 21A by welding, and the negative electrode lead 12 is attached to an end of the negative electrode current collector 22A by welding. Next, the positive electrode 21 and the negative electrode 22 on which the electrolyte layers 24 are formed are laminated with the separator 23 interposed therebetween to form a laminate, the laminate is wound in a longitudinal direction, and the protective tape 25 is adhered to the outermost peripheral portion of the laminate to form the wound electrode body 20.

The wound electrode body 20 is sealed by the exterior members 30 as follows. First, for example, the wound electrode body 20 is sandwiched between the flexible exterior members 30, and outer edge portions of the exterior members 30 are in close contact with each other and sealed by thermal fusion or the like. In this case, the adhesion films 31 are inserted between the exterior member 30 and the positive electrode lead 11 and between the exterior member 30 and the negative electrode lead 12. Note that the adhesion films 31 may be attached to the positive electrode lead 11 and the negative electrode lead 12 in advance, respectively. Further, emboss molding may be performed on the exterior members 30 in advance to form a recess portion as an accommodation space accommodating the wound electrode body 20. As a result, the battery 10 in which the wound electrode body 20 is accommodated by the exterior members 30 can be obtained.

Next, the battery 10 is molded by heat press, if necessary. More specifically, the battery 10 is heated at a temperature higher than normal temperature while being pressurized. Next, a pressing plate or the like is pressed against a main surface of the battery 10 to uniaxially press the battery 10, if necessary.

In the battery 10 according to the embodiment, the electrolyte layer 24 containing the fluororesin is provided between the positive electrode 21 and the separator 23. Further, the positive electrode 21 has the positive electrode active material layer 21B containing the fluorine-based binder having a melting point of 166° C. or less, and the content of the fluorine-based binder in the positive electrode active material layer 21B is 0.5% by mass or more and 2.8% by mass or less, and preferably, 0.7% by mass or more and 2.8% by mass or less. For this reason, the swelling of the battery 10 due to the gas generation can be suppressed. Further, the safety of the battery 10 can also be improved. Further, when the positive electrode 21 is wound in the flat shape, it is possible to suppress the positive electrode active material layer 21B from falling off from the positive electrode current collector 21A and to suppress the occurrence of the crack in the positive electrode active material layer 21B.

The separator 23 may have a configuration including a base material and a surface layer provided on one surface or both surfaces of the base material. The surface layer is an example of an intermediate layer, and contains inorganic particles having an electrical insulation property and a resin material binding the inorganic particles to a surface of the base material and binding the inorganic particles to each other. Note that in a case where the surface layer is provided only on one surface of the base material, the surface layer is provided on a surface facing the positive electrode 21. The separator 23 includes the surface layer described above, so that an adhesion property between the positive electrode active material layer 21B containing the fluorine-based binder having a melting point of 166° C. or less and the separator 23 can be enhanced. Therefore, it is possible to suppress the swelling of the battery 10 and improve the safety of the battery 10.

The resin material contained in the surface layer may be, for example, fibrillated to have a three-dimensional network structure in which fibrils are continuously connected to each other. The inorganic particles can be held in a dispersed state without being connected to each other by being supported in the resin material having this three-dimensional network structure. Further, the resin material may bind the surface of the base material and the inorganic particles to each other without being fibrillated. In this case, a higher binding property can be obtained. By providing the surface layer on one surface or both surfaces of the base material as described above, oxidation resistance, heat resistance, and mechanical strength can be imparted to the base material.

The base material is a porous layer having porosity. More specifically, the base material is a porous membrane formed of an insulating film having a high ion permeability and a predetermined mechanical strength, and the electrolytic solution is held in pores of the base material. It is preferable that the base material has a predetermined mechanical strength as a main part of the separator and also requires a high resistance to the electrolytic solution, a low reactivity, and a property of being hard to expand.

It is preferable to use, for example, a polyolefin resin such as polypropylene, polyethylene or the like, an acrylic resin, a styrene resin, a polyester resin, a nylon resin, or the like, as the resin material constituting the base material. In particular, polyethylene such as low density polyethylene, high density polyethylene, linear polyethylene, or the like, or a low molecular weight wax component thereof, or a polyolefin resin such as polypropylene is suitably used since it has an appropriate melting temperature and is easily obtained. Further, a structure in which these two or more types of porous membranes are laminated or a porous membrane formed by melt-kneading two or more types of resin materials may be used. When the separator includes the porous membrane formed of a polyolefin resin, the separator is excellent in terms of a separation property between the positive electrode 21 and the negative electrode 22 and further reduce a decrease in an internal short-circuit.

A non-woven fabric may be used as the base material. Aramid fibers, glass fibers, polyolefin fibers, polyethylene terephthalate (PET) fibers, nylon fibers, or the like can be used as fibers constituting the non-woven fabric. Further, a mixture of these two or more types of fibers may be used as the non-woven fabric.

The inorganic particles contain, for example, at least one of a metal oxide, a metal nitride, a metal carbide, a metal sulfide, and the like. It is preferable that the metal oxide includes at least one of aluminum oxide (alumina, $Al_2O_3$), boehmite (hydrated aluminum oxide), magnesium oxide (magnesia, MgO), titanium oxide (titania, $TiO_2$), zirconium oxide (zirconia, $ZrO_2$), silicon oxide (silica, $SiO_2$), yttrium oxide (yttria, $Y_2O_3$), and the like. It is preferable that the metal nitride includes at least one of silicon nitride ($Si_3N_4$), aluminum nitride (AlN), boron nitride (BN), titanium nitride (TIN), and the like. It is preferable that the metal carbide includes at least one of silicon carbide (SiC) and boron carbide ($B_4C$). It is preferable that the metal sulfide includes barium sulfate ($BaSO_4$) or the like. Further, the inorganic particles may contain at least one of minerals such as porous aluminosilicate such as zeolite ($M_{2/n}O \cdot Al_2O_3 \cdot xSiO_2 \cdot yH_2O$, M is a metal element, x≥2, y≥0) or the like, layered silicate, barium titanate ($BaTiO_3$), strontium titanate ($SrTiO_3$), and the like. Among them, it is preferable that the inorganic particles contain at least one of alumina, titania (in particular, titania having a rutile structure), silica, magnesia, and the like, and it is more preferable that the inorganic particles contain alumina. The inorganic particles have oxidation resistance and heat resistance, and the surface layer containing the inorganic particles and provided on the surface facing the positive electrode has a high resistance to an oxidization environment in the vicinity of the positive electrode at the time of charging. A shape of the inorganic particle is not particularly limited, and can be any one of a spherical shape, a plate shape, a fibrous shape, a cubic shape, a random shape, and the like.

Examples of the resin material constituting the surface layer can include a high heat resistance resin and the like whose at least one of a melting point and a glass transition temperature is 180° C. or more, such as a fluorine-containing resin such as polyvinylidene fluoride, polytetrafluoroethylene and the like; fluorine-containing rubber such as vinylidene fluoride-tetrafluoroethylene copolymer, ethylene-tetrafluoroethylene copolymer and the like; rubbers such as styrene-butadiene copolymer and hydride thereof, acrylonitrile-butadiene copolymer and hydride thereof, acrylonitrile-butadiene-styrene copolymer and hydride thereof, methacrylic acid ester-acrylic acid ester copolymer, styrene-acrylic acid ester copolymer, acrylonitrile-acrylic acid ester copolymer, ethylene propylene rubber, polyvinyl alcohol, polyvinyl acetate, and the like; a cellulose derivative such as ethyl cellulose, methyl cellulose, hydroxyethyl cellulose, carboxymethyl cellulose, and the like; polyamide such as polyphenylene ether, polysulfone, polyether sulfone, polyphenylene sulfide, polyether imide, polyimide, wholly aromatic polyamide (aramid), and the like; polyamide imide, polyacrylonitrile, polyvinyl alcohol, polyether, acrylic resin, polyester, and the like. These resin materials may be used alone or used in combination of two or more thereof. Among them, a fluororesin such as polyvinylidene fluoride or the like is preferable from the viewpoint of oxidation resistance and flexibility, and aramid or polyamideimide is preferable from the viewpoint of heat resistance.

It is preferable that a particle size of the inorganic particle is in the range of 1 nm to 10 μm. When the particle size of the inorganic particle is smaller than 1 nm, it is difficult to obtain a material having the inorganic particles, and even though such a material can be obtained, it is not appropriate in terms of cost. On the other hand, when the particle size of the inorganic particle is larger than 10 μm, a distance between electrodes becomes large, so that an amount of active material to be filled cannot be sufficiently obtained in a limited space, and a battery capacity thus becomes low.

As a method of forming the surface layer, for example, a method of coating a slurry including a matrix resin, a solvent, and an inorganic material on a base material (porous membrane) and allowing the slurry to pass through a poor solvent of the matrix resin and a solvent affinity bath of the solvent to be subjected to phase separation, and then drying the slurry can be used.

It should be understood that the inorganic particles described above may be contained in the porous membrane as the base material.

The surface layer may be formed only of the resin material without containing the inorganic particles. In this case, a fluororesin is used as the resin material. Even in a case where the surface layer does not contain the inorganic particles, if the surface layer contains the fluororesin, an adhesion property between the positive electrode active material layer 21B containing the fluorine-based binder having a melting point of 166° C. or less and the separator 23 can be enhanced. Therefore, it is possible to suppress the swelling of the battery 10 and improve the safety of the battery 10.

Examples of the fluororesin can include a high heat resistance resin or the like whose at least one of a melting point and a glass transition temperature is 180° C. or more, such as fluorine-containing rubber such as polyvinylidene fluoride, polytetrafluoroethylene and the like; fluorine-containing rubber such as vinylidene fluoride-tetrafluoroethylene copolymer, ethylene-tetrafluoroethylene copolymer and the like, and the like. These resin materials may be used alone or used in combination of two or more thereof.

The electrolyte layer 24 provided between the positive electrode 21 and the separator 23 may further contain particles. The particles are similar to those of Modified Example 1. Further, similarly, the electrolyte layer 24 provided between the negative electrode 22 and the separator 23 may further contain particles.

The electrolyte layer 24 provided between the positive electrode 21 and the separator 23 may contain a resin other than the fluororesin and particles. The particles are similar to those of Modified Example 1. Further, similarly, the electrolyte layer 24 provided between the negative electrode 22 and the separator 23 may contain a resin other than the fluororesin and particles.

A case where both of the electrolyte layer 24 provided between the positive electrode 21 and the separator 23 and the electrolyte layer 24 provided between the negative electrode 22 and the separator 23 contain the fluororesin has been described in the embodiment, but the electrolyte layer 24 provided between the negative electrode 22 and the separator 23 may contain the fluororesin or may not contain the fluororesin. In this case, the electrolyte layer 24 provided between the negative electrode 22 and the separator 23 contains at least one of, for example, polyacrylonitrile, polyvinylidene fluoride, copolymer of vinylidene fluoride and hexafluoropropylene, polytetrafluoroethylene, polyhexafluoropropylene, polyethylene oxide, polypropylene oxide, polyphosphazene, polysiloxane, polyvinyl acetate, polyvinyl alcohol, polymethyl methacrylate, polyacrylic acid, polymethacrylic acid, styrene-butadiene rubber, nitrile-butadiene rubber, polystyrene, and polycarbonate, as a polymer compound. In particular, in view of electrochemical stability, it is preferable that the electrolyte layer 24 provided between the negative electrode 22 and the separator 23 contains at least one of polyacrylonitrile, polyvinylidene fluoride, polyhexafluoropropylene, and polyethylene oxide.

An example in which the present technology is applied to the battery having a flat shape has been described in the embodiment, but the present technology is also applicable to a battery having a square shape, a cylindrical shape, a curved shape, or a bent shape. Further, an example in which the present technology is applied to the battery including the laminate film as the exterior member has been described in the embodiment, but the present technology is also applicable to a battery including a metal can as the exterior member.

For example, the present technology is also applicable to a cylindrical type battery including a metal can as the exterior member, but it is preferable that the present technology is applied to a laminate film type battery, particularly to a laminate film type battery having a flat shape. This is due to the following reasons. In other words, in a case of the cylindrical type battery, the exterior material is a metal can, and it is thus difficult that swelling occurs in the battery. Further, the electrode body has a cylindrical shape, and it is thus difficult that a crack occurs in the electrode at the time of winding the electrode body. On the other hand, in the laminate film type battery, the exterior material is the laminate film, and it is thus easy that swelling occurs in the battery. Further, the electrode body has a flat shape, and it is thus easy that a crack occurs in the electrode at the time of winding the electrode body.

An example in which the present technology is applied to the battery having rigidity has been described in the embodiment, but the present technology is also applicable to a flexible battery.

A configuration in which the positive electrode lead and the negative electrode lead are led from the same side of the exterior material in the same direction has been described as an example in the embodiment, configurations of the positive electrode lead and the negative electrode lead are not limited thereto. For example, the positive electrode lead and the negative electrode lead may be led from different sides of the exterior material in different directions.

A case where the electrolyte contains the non-aqueous electrolytic solution and the polymer compound that serves as the holding body holding the non-aqueous electrolytic solution has been described as an example in the embodiment, but the electrolyte may be a liquid electrolyte, that is, an electrolytic solution.

The positive electrode active material layer may contain a binder other than the fluorine-based binder, if necessary. For example, the positive electrode active material layer may contain at least one selected from resin materials such as polyacrylonitrile (PAN), styrene butadiene rubber (SBR), and carboxymethylcellulose (CMC) and the like, and copolymers containing these resin materials as main constituents, and the like, in addition to fluorine-based binder.

The positive electrode active material layer may contain a fluorine-based binder other than polyvinylidene fluoride, if necessary. For example, the positive electrode active material layer may contain at least one of polytetrafluoroethylene (PTFE) and a VdF-based copolymer containing VdF as one of monomers, in addition to polyvinylidene fluoride.

As the VdF-based copolymer, for example, a copolymer of vinylidene fluoride (VdF) and at least one selected from the group consisting of hexafluoropropylene (HFP), chlorotrifluoroethylene (CTFE), tetrafluoroethylene (TFE), and the like, can be used. More specifically, at least one selected from the group consisting of a PVdF-HFP copolymer, a PVdF-CTFE copolymer, a PVdF-TFE copolymer, a PVdF—HFP-CTFE copolymer, a PVdF-HFP-TFE copolymer, a PVdF-CTFE-TFE copolymer, a PVdF—HFP-CTFE-TFE copolymer, and the like, can be used. As the VdF-based copolymer, a VdF-based copolymer whose a part of a terminal or the like is modified with a carboxylic acid such as a maleic acid or the like may be used.

In Application Example 1, a battery pack and an electronic device including the battery according to the embodiment or the modified example thereof will be described.

Figure 3:
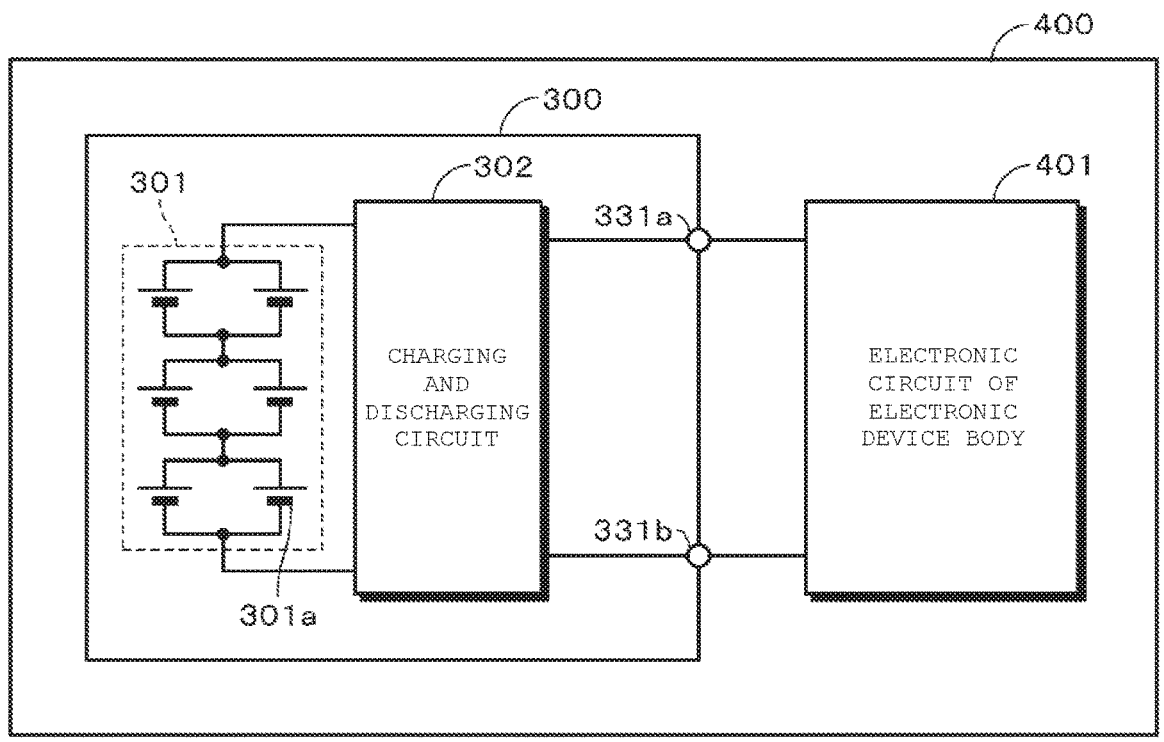
FIG. 3 is a block diagram illustrating an example of a configuration of an electronic device as an application example according to an embodiment of the present technology.

Hereinafter, one configuration example of a battery pack 300 and an electronic device 400 as an application example will be described with reference to FIG. 3. The electronic device 400 includes an electronic circuit 401 of an electronic device body and the battery pack 300. The battery pack 300 is electrically connected to the electronic circuit 401 through a positive electrode terminal 331a and a negative electrode terminal 331b. The electronic device 400 has, for example, a configuration in which a user can attach and detach the battery pack 300 to and from the electronic device 400. It should be understood that the configuration of the electronic device 400 is not limited thereto, and may be a configuration in which the battery pack 300 is embedded in the electronic device 400 so that the user cannot remove the battery pack 300 from the electronic device 400.

At the time of charging of the battery pack 300, the positive electrode terminal 331a and the negative electrode terminal 331b of the battery pack 300 are connected to a positive electrode terminal and a negative electrode terminal of a charger (not illustrated), respectively. On the other hand, at the time of discharging of the battery pack 300 (at the time of using the electronic device 400), the positive electrode terminal 331a and the negative electrode terminal 331b of the battery pack 300 are connected to a positive electrode terminal and a negative electrode terminal of the electronic circuit 401, respectively.

Examples of the electronic device 400 can include a laptop personal computer (PC), a tablet type computer, a mobile phone (for example, a smartphone), personal digital assistants (PDA), a display device (a liquid crystal display (LCD), an electroluminescence (EL) display, electronic paper, or the like), an imaging device (for example, a digital still camera, a digital video camera or the like), an audio device (for example, a portable audio player), a game machine, a cordless handset, an electronic book, an electronic dictionary, a radio, a headphone, a navigation system, a memory card, a pacemaker, a hearing aid, an electric tool, an electric shaver, a refrigerator, an air conditioner, a television, a stereo, a water heater, a microwave oven, a dishwasher, a washing machine, a dryer, a lighting device, a toy, a medical device, a robot, a road conditioner, a traffic signal, and the like, but are not limited thereto.

The electronic circuit 401 includes, for example, a central processing unit (CPU), a peripheral logic unit, an interface unit, a storage unit, and the like, and generally controls the whole electronic device 400.

Figure 5:
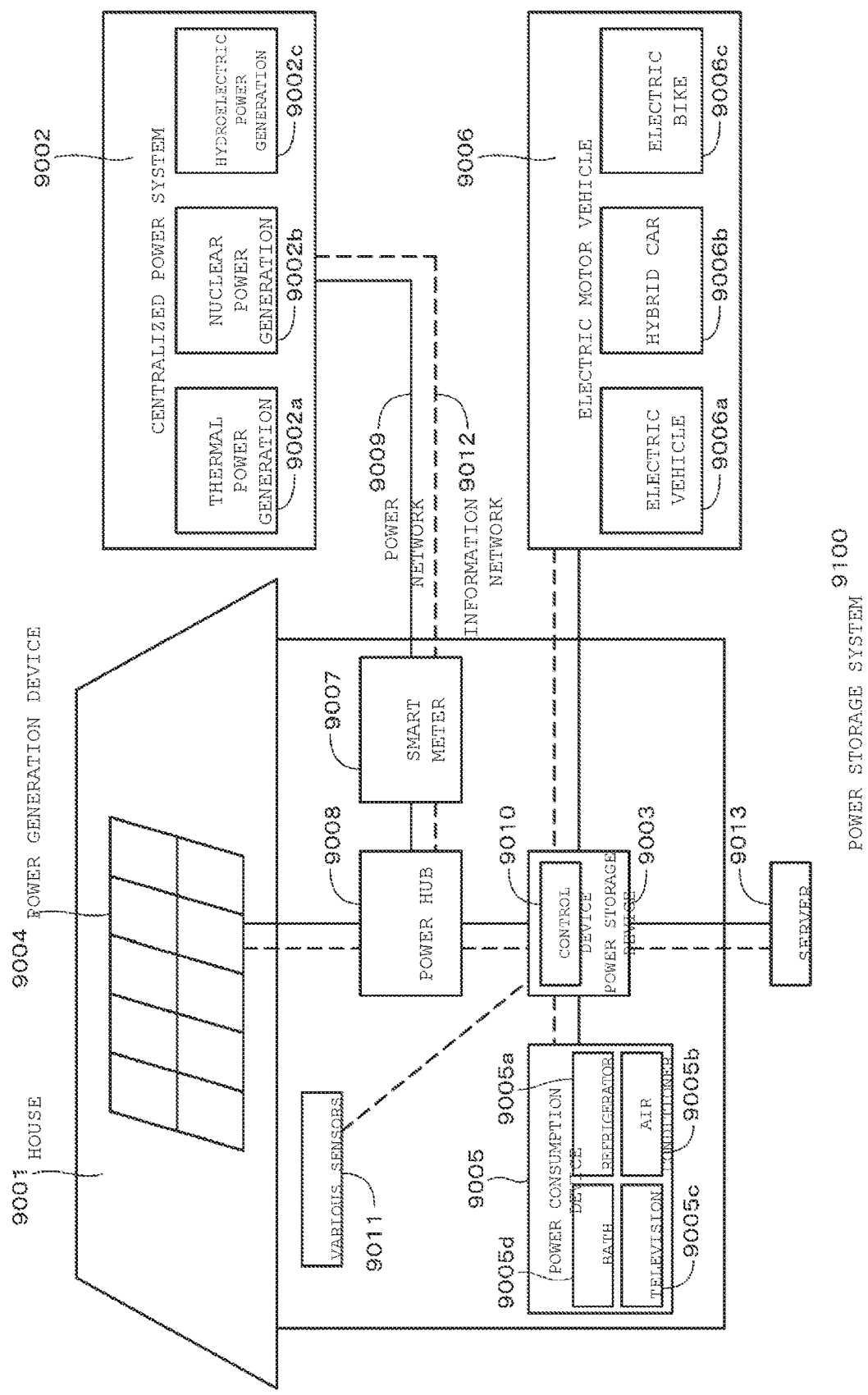
FIG. 5 is a schematic view illustrating an example of a configuration of a power storage system in a house as an application example according to an embodiment of the present technology.

The battery pack 300 includes an assembled battery 301 and a charging and discharging circuit 302. The assembled battery 301 is configured by connecting a plurality of secondary batteries 301a to one another in series and/or in parallel. The plurality of secondary batteries 301a are connected to one another, for example, in n parallels and m series (n and m are positive integers). Note that an example in which six secondary batteries 301a are connected to one another in two parallels and three series (2P3S) is illustrated in FIG. 5. As the secondary battery 301a, a battery according to the embodiment or the modified example thereof is used.

Here, a case where the battery pack 300 includes the assembled battery 301 including the plurality of secondary batteries 301a will be described, a configuration in which the battery pack 300 includes a single secondary battery 301a instead of the assembled battery 301 may be adopted.

The charging and discharging circuit 302 is a control unit that controls charging and discharging of the assembled battery 301. Specifically, at the time of charging, the charging and discharging circuit 302 controls the charging of the assembled battery 301. On the other hand, at the time of discharging (that is, at the time of using the electronic device 400), the charging and discharging circuit 302 controls the discharging of the electronic device 400.

Figure 4:
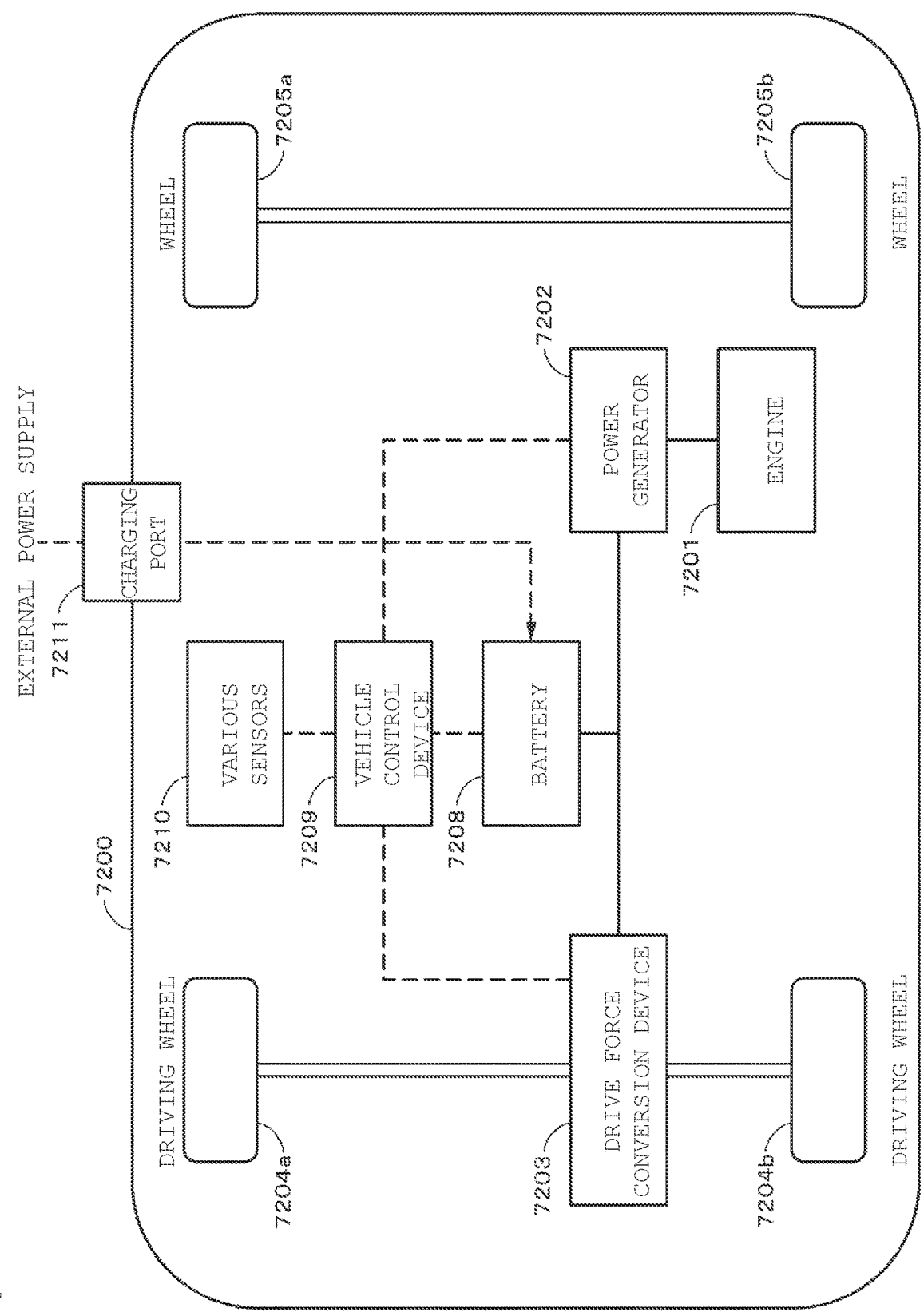
FIG. 4 is a schematic view illustrating an example of a configuration of a power storage system in a vehicle as an application example according to an embodiment of the present technology.

An example in which the present disclosure is applied to a power storage system for a vehicle is described with reference to FIG. 4. FIG. 4 schematically illustrates an example of a configuration of a hybrid vehicle adopting a series hybrid system to which the present disclosure is applied. The series hybrid system is a car that travels by a drive force conversion device using power generated by a power generator driven by an engine or power generated by the power generator and stored in a battery.

The hybrid vehicle 7200 is mounted with an engine 7201, a power generator 7202, a drive force conversion device (converter) 7203, a driving wheel 7204a, a driving wheel 7204b, a wheel 7205a, a wheel 7205b, a battery 7208, a vehicle control device (controller) 7209 including a processor, various sensors 7210, and a charging port 7211. The power storage device of the present disclosure described above is applied to the battery 7208.

The hybrid vehicle 7200 travels using the drive force conversion device 7203 as a power source. An example of the drive force conversion device 7203 is a motor. The drive force conversion device (converter) 7203 is operated by power of the battery 7208, and a torque of the drive force conversion device 7203 is transmitted to the driving wheels 7204a and 7204b. It should be understood that the drive force conversion device 7203 can be applied to either an alternating current (AC) motor or a direct current (DC) motor by using DC to AC conversion or reverse conversion (AC to DC conversion) at a necessary place. The various sensors 7210 controls an engine speed through the vehicle control device (controller) 7209 and controls an opening degree (throttle opening degree) of a throttle valve (not illustrated). The various sensors 7210 include a speed sensor, an acceleration sensor, an engine revolution per minute (RPM) sensor, and the like.

A torque of the engine 7201 is transmitted to the power generator 7202, and power generated by the power generator 7202 with the torque can be stored in the battery 7208.

When the hybrid vehicle is decelerated by a braking mechanism (not illustrated), a resistance force at the time of the deceleration of the hybrid vehicle is applied as a torque to the drive force conversion device 7203, and regenerative power generated by the drive force conversion device 7203 with the torque is accumulated in the battery 7208.

The battery 7208 can be connected to an external power supply of the hybrid vehicle to receive power supplied from the external power supply using the charging port 211 as an input port and store the received power.

Although not illustrated, the hybrid vehicle may include an information processing device performing information processing related to vehicle control based on information regarding a secondary battery. Examples of such an information processing device include an information processing device displaying a battery remaining amount based on information regarding the battery remaining amount.

It should be understood that the series hybrid vehicle traveling by the motor using the power generated by the power generator driven by the engine or the power generated by the power generator and stored in the battery has been described as an example hereinabove. However, the present disclosure is effectively applicable to a parallel hybrid vehicle that appropriately switches and uses three manners such as a manner of traveling only by an engine, a manner of traveling only by a motor, and a manner of traveling by an engine and a motor using both of outputs of the engine and the motor as driving sources. Moreover, the present disclosure is effectively applicable to a so-called electric motor vehicle traveling by driving only by a drive motor without using an engine.

An example of the hybrid vehicle 7200 to which the technology according to the present disclosure can be applied has been described hereinabove. The technology according to the present disclosure can be suitably applied to the battery 7208 among the configurations described above.

An example in which the present disclosure is applied to a power storage system for a house is described with reference to FIG. 5. For example, in a power storage system 9100 for a house 9001, power is supplied from a centralized power system 9002 such as a thermal power generation 9002a, a nuclear power generation 9002b, a hydroelectric power generation 9002c, and the like, to a power storage device 9003 through a power network 9009, an information network 9012, a smart meter 9007, a power hub 9008, and the like. In addition, power is supplied from an independent power supply such as an in-home power generation device 9004 or the like to the power storage device 9003. The power supplied to the power storage device 9003 is stored. The power used in the house 9001 is supplied using the power storage device 9003. A similar power storage system can be used for a building as well as the house 9001.

The house 9001 is provided with the power generation device 9004, a power consumption device 9005, the power storage device 9003, a control device 9010 controlling the respective devices, the smart meter 9007, and sensors 9011 acquiring various types of information. The respective devices are connected to each other by the power network 9009 and the information network 9012. A solar cell, a fuel cell or the like is used as the power generation device 9004, and power generated by the power generation device 9004 is supplied to the power consumption device 9005 and/or the power storage device 9003. The power consumption device 9005 is, for example, a refrigerator 9005a, an air conditioner 9005b, a television receiver 9005c, a bath 9005d, or the like. Moreover, the power consumption device 9005 includes an electric motor vehicle 9006. The electric motor vehicle 9006 is an electric car 9006a, a hybrid car 9006b, and an electric bike 9006c.

The battery unit is applied to the power storage device 9003. The power storage device 9003 includes a secondary battery or a capacitor. For example, the power storage device includes a lithium ion battery. The lithium ion battery may be a stationary battery or may be used in the electric motor vehicle 9006. The smart meter 9007 has a function of measuring an amount of used commercial power and transmitting the measured amount to a power company. The power network 9009 may combine one or more of direct current feeding, alternating current feeding, and non-contact feeding with each other.

The various sensors 9011 are, for example, a human sensor, an illuminance sensor, an object detection sensor, a power consumption sensor, a vibration sensor, a contact sensor, a temperature sensor, an infrared sensor, and the like. Information acquired by the various sensors 9011 is transmitted to the control device 9010. A state of the weather, a state of a person and the like are grasped by the information from the sensors 9011, and the power consumption device 9005 can be automatically controlled to minimize energy consumption. Moreover, the control device 9010 can transmit information regarding the house 9001 to an external power company or the like through the Internet.

The power hub 9008 performs processing such as branching of power lines, DC to AC conversion or the like. As a communication method of the information network 9012 connected to the control device 9010, there are a method of using a communication interface such as universal asynchronous receiver-transmitter (UART) or the like and a method of using a sensor network according to a wireless communication standard such as Bluetooth (registered trademark), ZigBee (registered trademark), wireless fidelity (Wi-Fi), or the like. The Bluetooth method is applied to multimedia communication, and can perform one-to-many connection communication. ZigBee (registered trademark) uses a physical layer of Institute of Electrical and Electronics Engineers (IEEE) 802.15.4. IEEE 802.15.4 is a name of a short distance wireless network standard called a personal area network (PAN) or a wireless PAN (W PAN).

The control device 9010 is connected to an external server 9013. This server 9013 may be managed by any one of the house 9001, the power company, and a service provider. Information transmitted and received by the server 9013 is, for example, power consumption information, life pattern information, power rates, weather information, natural disaster information, and information regarding power transactions. These types of information may be transmitted and received from an in-home power consumption device (for example, a television receiver), but may be transmitted and received from an out-home device (for example, a mobile phone or the like). These types of information may be displayed on a device having a display function, for example, a television receiver, a mobile phone, a PDA, or the like.

The control device 9010 controlling each unit includes a CPU, a random access memory (RAM), a read only memory (ROM), and the like, and is included in the power storage device 9003 in this example. The control device 9010 is connected to the power storage device 9003, the in-home power generation device 9004, the power consumption device 9005, the various sensors 9011, and the server 9013 by the information network 9012, and has, for example, a function of adjusting the amount of the used commercial power and an amount of generated power. Note that the control device 9010 may have a function of conducting power transactions in a power market, and the like, in addition to the function described above.

As described above, power generated by the in-home power generation device 9004 (solar power generation and wind power generation) as well as power generated by the centralized power system 9002 such as the thermal power 9002a, the nuclear power 9002b, the hydraulic power 9002c, and the like, can be stored in the power storage device 9003. Therefore, even though the power generated by the in-home power generation device 9004 fluctuates, it is possible to perform control to transmit an amount of power transmitted to the outside is made constant or discharge a necessary amount of power. For example, it is possible to store the power obtained by the solar power generation in the power storage device 9003, store midnight power whose rates are low in the power storage device 9003 at night, and discharge and use the power stored by the power storage device 9003 in a time zone in which rates in the daytime are high.

It should be understood that an example in which the control device 9010 is included in the power storage device 9003 has been described in this example, but the control device 9010 may be included in the smart meter 9007 or may be configured alone. Moreover, the power storage system 9100 may be used for a plurality of homes in an apartment house, or may be used for a plurality of detached houses.

An example of the power storage system 9100 to which the technology according to the present disclosure can be applied has been described hereinabove. The technology according to the present disclosure can be suitably applied to a secondary battery included in the power storage device 9003 among the configurations described above.

EXAMPLES

Hereinafter, the present technology will be specifically described by way of examples, but the present technology is not limited to only these examples.

Example 1-1-A

A positive electrode was manufactured as follows. First, 98.8% by mass of lithium cobalt composite oxide ($LiCoO_2$) as a positive electrode active material, 0.7% by mass of polyvinylidene fluoride (PVdF (homopolymer of vinylidene fluoride)) having a melting point of 155° C. as a binder, and 0.5% by mass of carbon black as a conductive agent were mixed with one another to obtain a positive electrode mixture, and the positive electrode mixture was then dispersed in an organic solvent (N-methyl-2-pyrrolidone: NMP) to obtain a paste-like positive electrode mixture slurry. Subsequently, the positive electrode mixture slurry was coated on a positive electrode current collector (aluminum foil) using a coating device and then dried to form a positive electrode active material layer. Finally, the positive electrode active material layer was compression-molded using a press machine.

A negative electrode was manufactured as follows. First, 96% by mass of artificial graphite powder as a negative electrode active material, 1% by mass of styrene butadiene rubber (SBR) as a first binder, 2% by mass of polyvinylidene fluoride (PVdF) as a second binder, and 1% by mass of carboxymethylcellulose (CMC) were mixed with one another to obtain a negative electrode mixture, and the negative electrode mixture was then dispersed in an organic solvent (N-methyl-2-pyrrolidone: NMP) to obtain a paste-like negative electrode mixture slurry. Subsequently, the negative electrode mixture slurry was coated on a negative electrode current collector (copper foil) using a coating device and then dried. Finally, the negative electrode active material layer was compression-molded using a press machine.

An electrolytic solution was prepared as follows. First, ethylene carbonate (EC), propylene carbonate (PC), and diethyl carbonate (DC) were mixed with one another in a mass ratio of EC:PC:DC=15:15:70 to prepare a mixed solvent. Subsequently, lithium hexafluorophosphate ($LiPF_6$) was dissolved as an electrolyte salt in this mixed solvent so as to be 1 mol/l to prepare an electrolytic solution.

A laminate type battery was manufactured as follows. First, a positive electrode lead formed of aluminum was welded to the positive electrode current collector, and a negative electrode lead formed of copper was welded to the negative electrode current collector. Subsequently, the positive electrode and the negative electrode were brought into close contact with each other with a separator interposed therebetween, the separator having fluororesins (vinylidene fluoride-hexafluoropropylene copolymer (VDF-HFP copolymer)) coated on both surfaces of a microporous polyethylene film, and were then wound in a longitudinal direction, and a protective tape was attached to the outermost peripheral portion to manufacture a wound electrode body having a flat shape. Next, the wound electrode body was loaded between exterior members, three sides of the exterior members were thermally fused to one another, and one side of the exterior members was made to have an opening without being thermally fused. As the exterior member, a moisture-proof aluminum laminate film in which a nylon film having a thickness of 25 μm, an aluminum foil having a thickness of 40 μm, and a polypropylene film having a thickness of 30 μm are laminated sequentially from the outermost layer was used.

Thereafter, an electrolytic solution was injected from the opening of the exterior members, and the remaining side of the exterior members was thermally fused under a reduced pressure to seal the wound electrode body. As a result, the laminate type battery of interest was obtained. Note that the laminate type battery is designed such that an open circuit voltage (that is, a battery voltage) at the time of full charging of the laminate type battery is 4.40V by adjusting an amount of the positive electrode active material and an amount of the negative electrode active material.

Example 1-2-A

A laminate type battery was obtained in the same manner as in Example 1-1-A except that a separator in which alumina was held on both surfaces of a microporous polyethylene film was used.

Example 1-3-A

A laminate type battery was obtained in the same manner as in Example 1-1-A except that a microporous polyethylene film was used as a separator, gel electrolyte layers were formed on a positive electrode and a negative electrode, and an electrolytic solution was not injected.

The gel electrolyte layers were formed as follows. First, ethylene carbonate (EC), propylene carbonate (PC) were mixed with each other in a mass ratio of EC:PC=50:50 to prepare a mixed solvent. Subsequently, lithium hexafluorophosphate ($LiPF_6$) was dissolved as an electrolyte salt in this mixed solvent so as to be 1 mol/l to prepare an electrolytic solution.

Next, a precursor solution containing the prepared electrolytic solution, polyvinylidene fluoride (PVdF) as a polymer compound for an electrolyte, and dimethyl carbonate (DMC) as an organic solvent was prepared and then coated on the positive electrode and the negative electrode to form the gel electrolyte layers.

Examples 1-4-A and 1-5-A

A laminate type battery was obtained in the same manner as in Examples 1-1-A and 1-3-A except that 97.1% by mass of lithium cobalt composite oxide ($LiCoO_2$) as a positive electrode active material, 1.4% by mass of polyvinylidene fluoride (PVdF) having a melting point of 155° C. as a binder, and 1.5% by mass of carbon black as a conductive agent were mixed with one another to obtain a positive electrode mixture.

Examples 1-6-A, 1-7-A, and 1-8-A

A laminate type battery was obtained in the same manner as in Examples 1-1-A, 1-2-A, and 1-3-A except that 94.4% by mass of lithium cobalt composite oxide ($LiCoO_2$) as a positive electrode active material, 2.8% by mass of polyvinylidene fluoride (PVdF) having a melting point of 155° C. as a binder, and 2.8% by mass of carbon black as a conductive agent were mixed with one another to obtain a positive electrode mixture.

Examples 1-9-A, 1-10-A, and 1-11-A

A laminate type battery was obtained in the same manner as in Examples 1-1-A, 1-2-A, and 1-3-A except that 99.2% by mass of lithium cobalt composite oxide ($LiCoO_2$) as a positive electrode active material, 0.5% by mass of polyvinylidene fluoride (PVdF) having a melting point of 155° C. as a binder, and 0.3% by mass of carbon black as a conductive agent were mixed with one another to obtain a positive electrode mixture.

Examples 2-1-A to 2-8-A

A laminate type battery was obtained in the same manner as in Examples 1-1-A to 1-8-A except that polyvinylidene fluoride (PVdF) having a melting point of 166° C. was used as a binder.

Examples 2-9-A to 2-11-A

A Laminate type battery was obtained in the same manner as in Examples 1-9-A to 1-11-A except that polyvinylidene fluoride (PVdF) having a melting point of 166° C. was used as a binder.

Comparative Example 1-1-A

A laminate type battery was obtained in the same manner as in Example 1-1-A except that a microporous polyethylene film without a coating was used as a separator.

Comparative Example 1-2-A

A laminate type battery was obtained in the same manner as in Example 1-4-A except that a microporous polyethylene film without a coating was used as a separator.

Comparative Examples 1-3-A and 1-4-A

A laminate type battery was obtained in the same manner as in Examples 1-1-A and 1-2-A except that 94.3% by mass of lithium cobalt composite oxide ($LiCoO_2$) as a positive electrode active material, 2.8% by mass of polyvinylidene fluoride (PVdF) having a melting point of 155° C. as a binder, and 2.9% by mass of carbon black as a conductive agent were mixed with one another to obtain a positive electrode mixture.

Comparative Example 1-5-A 94.3% by mass of lithium cobalt composite oxide ($LiCoO_2$) as a positive electrode active material, 2.8% by mass of polyvinylidene fluoride (PVdF) having a melting point of 155° C. as a binder, and 2.9% by mass of carbon black as a conductive agent were mixed with one another to obtain a positive electrode mixture. Further, a microporous polyethylene film without a coating was used as a separator. A laminate type battery was obtained in the same manner as in Example 1-1-A except for those described above.

Comparative Examples 1-6-A and 1-7-A

A laminate type battery was obtained in the same manner as in Examples 1-1-A and 1-2-A except that 94.2% by mass of lithium cobalt composite oxide ($LiCoO_2$) as a positive electrode active material, 2.8% by mass of polyvinylidene fluoride (PVdF) having a melting point of 155° C. as a binder, and 3.0% by mass of carbon black as a conductive agent were mixed with one another to obtain a positive electrode mixture.

Comparative Examples 1-8-A and 1-9-A

A Laminate type battery was obtained in the same manner as in Examples 1-1-A and 1-2-A except that 94.1% by mass of lithium cobalt composite oxide ($LiCoO_2$) as a positive electrode active material, 2.9% by mass of polyvinylidene fluoride (PVdF) having a melting point of 155° C. as a binder, and 3.0% by mass of carbon black as a conductive agent were mixed with one another to obtain a positive electrode mixture.

Comparative Example 1-10-A 94.1% by mass of lithium cobalt composite oxide ($LiCoO_2$) as a positive electrode active material, 2.9% by mass of polyvinylidene fluoride (PVdF) having a melting point of 155° C. as a binder, and 3.0% by mass of carbon black as a conductive agent were mixed with one another to obtain a positive electrode mixture. Further, a microporous polyethylene film without a coating was used as a separator. A laminate type battery was obtained in the same manner as in Example 1-1-A except for those described above.

Comparative Example 1-11-A

A laminate type battery was obtained in the same manner as in Example 1-3-A except that 94.1% by mass of lithium cobalt composite oxide ($LiCoO_2$) as a positive electrode active material, 2.9% by mass of polyvinylidene fluoride (PVdF) having a melting point of 155° C. as a binder, and 3.0% by mass of carbon black as a conductive agent were mixed with one another to obtain a positive electrode mixture.

Comparative Example 1-12-A

A laminate type battery was obtained in the same manner as in Example 1-3-A except that 93.5% by mass of lithium cobalt composite oxide ($LiCoO_2$) as a positive electrode active material, 3.5% by mass of polyvinylidene fluoride (PVdF) having a melting point of 155° C. as a binder, and 3.0% by mass of carbon black as a conductive agent were mixed with one another to obtain a positive electrode mixture.

Comparative Example 1-13-A

A laminate type battery was obtained in the same manner as in Example 1-9-A except that a microporous polyethylene film without a coating was used as a separator.

Comparative Examples 2-1-A to 2-12-A

A laminate type battery was obtained in the same manner as in Comparative Examples 1-1-A to 1-12-A except that polyvinylidene fluoride (PVdF) having a melting point of 166° C. was used as a binder.

Comparative Example 2-13-A

A laminate type battery was obtained in the same manner as in Comparative Example 1-13-A except that polyvinylidene fluoride (PVdF) having a melting point of 166° C. was used as a binder.

Comparative Examples 3-1-A to 3-8-A

A laminate type battery was obtained in the same manner as in Examples 1-1-A to 1-8-A except that polyvinylidene fluoride (PVdF) having a melting point of 172° C. was used as a binder.

Comparative Examples 3-9-A to 3-11-A

A laminate type battery was obtained in the same manner as in Examples 1-9-A to 1-11-A except that polyvinylidene fluoride (PVdF) having a melting point of 172° C. was used as a binder.

Comparative Examples 4-1-A to 4-12-A

A laminate type battery was obtained in the same manner as in Comparative Examples 1-1-A to 1-12-A except that polyvinylidene fluoride (PVdF) having a melting point of 172° C. was used as a binder.

Comparative Example 4-13-A

A laminate type battery was obtained in the same manner as in Comparative Example 1-13-A except that polyvinylidene fluoride (PVdF) having a melting point of 172° C. was used as a binder.

Examples 1-1-B, 1-2-B, 1-4-B, 1-6-B, and 1-7-B

First, a wound electrode body having a cylindrical shape was manufactured in the same manner as in Examples 1-1-A, 1-2-A, 1-4-A, 1-6-A, and 1-7-A except that a positive electrode and a negative electrode were wound in a cylindrical shape with a separator interposed therebetween. Next, the wound electrode body was sandwiched between a pair of insulating plates, and a negative electrode lead was welded to a battery can and a positive electrode lead was welded to a safety valve mechanism, so that the wound electrode body was housed in the battery can plated with nickel and formed of iron. Thereafter, an electrolytic solution was prepared in the same manner as in Example 1-1-A, and was injected into the battery can by a decompression method to obtain a cylindrical battery having a diameter of 18 mm and a height of 65 mm.

Examples 1-3-B, 1-5-B, and 1-8-B

First, a wound electrode body having a cylindrical shape was manufactured in the same manner as in Examples 1-3-A, 1-5-A, and 1-8-A except that a positive electrode and a negative electrode on which gel electrolyte layers are formed were wound in a cylindrical shape with a separator interposed therebetween. Next, the wound electrode body was sandwiched between a pair of insulating plates, and a negative electrode lead was welded to a battery can and a positive electrode lead was welded to a safety valve mechanism, so that the wound electrode body was housed in the battery can plated with nickel and formed of iron. Thereafter, diethyl carbonate was injected into the battery can by a decompression method to obtain a cylindrical battery having a diameter of 18 mm and a height of 65 mm.

Examples 1-9-B and 1-10-B

First, a wound electrode body having a cylindrical shape was manufactured in the same manner as in Examples 1-9-A and 1-10-A except that a positive electrode and a negative electrode were wound in a cylindrical shape with a separator interposed therebetween. Next, a cylindrical battery having a diameter of 18 mm and a height of 65 mm was obtained in the same manner as in Example 1-1-B, using the wound electrode body.

Example 1-11-B

First, a wound electrode body having a cylindrical shape was manufactured in the same manner as in Example 1-11-A except that a positive electrode and a negative electrode on which gel electrolyte layers are formed were wound in a cylindrical shape with a separator interposed therebetween. Next, a cylindrical battery having a diameter of 18 mm and a height of 65 mm was obtained in the same manner as in Example 1-3-B, using the wound electrode body.

Examples 2-1-B and 2-8-B

A cylindrical battery was obtained in the same manner as in Examples 1-1-B to 1-8-B except that polyvinylidene fluoride (PVdF) having a melting point of 166° C. was used as a binder.

Examples 2-9-B to 2-11-B

A cylindrical battery was obtained in the same manner as in Examples 1-9-B to 1-11-B except that polyvinylidene fluoride (PVdF) having a melting point of 166° C. was used as a binder.

Comparative Examples 1-1-B to 1-10-B

First, a wound electrode body having a cylindrical shape was manufactured in the same manner as in Comparative Examples 1-1-A to 1-10-A except that a positive electrode and a negative electrode were wound in a cylindrical shape with a separator interposed therebetween. Next, the wound electrode body was sandwiched between a pair of insulating plates, and a negative electrode lead was welded to a battery can and a positive electrode lead was welded to a safety valve mechanism, so that the wound electrode body was housed in the battery can plated with nickel and formed of iron. Thereafter, an electrolytic solution was prepared in the same manner as in Example 1-1-A, and was injected into the battery can by a decompression method to obtain a cylindrical battery having a diameter of 18 mm and a height of 65 mm.

Comparative Examples 1-11-B and 1-12-B

First, a wound electrode body having a cylindrical shape was manufactured in the same manner as in Comparative Examples 1-11-A and 1-12-A except that a positive electrode and a negative electrode on which gel electrolyte layers are formed were wound in a cylindrical shape with a separator interposed therebetween. Next, the wound electrode body was sandwiched between a pair of insulating plates, and a negative electrode lead was welded to a battery can and a positive electrode lead was welded to a safety valve mechanism, so that the wound electrode body was housed in the battery can plated with nickel and formed of iron. Thereafter, diethyl carbonate was injected into the battery can by a decompression method to obtain a cylindrical battery having a diameter of 18 mm and a height of 65 mm.

Comparative Example 1-13-B

First, a wound electrode body having a cylindrical shape was manufactured in the same manner as in Comparative Example 1-13-A except that a positive electrode and a negative electrode were wound in a cylindrical shape with a separator interposed therebetween. Next, a cylindrical battery having a diameter of 18 mm and a height of 65 mm was obtained in the same manner as in Comparative Example 1-1-B, using the wound electrode body.

Comparative Examples 2-1-B to 2-12-B

A cylindrical battery was obtained in the same manner as in Comparative Examples 1-1-B to 1-12-B except that polyvinylidene fluoride (PVdF) having a melting point of 166° C. was used as a binder.

Comparative Example 2-13-B

A cylindrical battery was obtained in the same manner as in Comparative Example 1-13-B except that polyvinylidene fluoride (PVdF) having a melting point of 166° C. was used as a binder.

Comparative Examples 3-1-B to 3-8-B

A cylindrical battery was obtained in the same manner as in Examples 1-1-B to 1-8-B except that polyvinylidene fluoride (PVdF) having a melting point of 172° C. was used as a binder.

Comparative Examples 3-9-B to 3-11-B

A cylindrical battery was obtained in the same manner as in Examples 1-9-B to 1-11-B except that polyvinylidene fluoride (PVdF) having a melting point of 172° C. was used as a binder.

Comparative Examples 4-1-B to 4-12-B

A cylindrical battery was obtained in the same manner as in Comparative Examples 1-1-B to 1-12-B except that polyvinylidene fluoride (PVdF) having a melting point of 172° C. was used as a binder.

Comparative Example 4-13-B

A cylindrical battery was obtained in the same manner as in Comparative Example 1-13-B except that polyvinylidene fluoride (PVdF) having a melting point of 172° C. was used as a binder.

An evaluation of a high temperature preservation swelling ratio, a heating test, a nailing test, and a positive electrode crack was performed on the battery obtained as described above as follows. Further, fall-off of the positive electrode active material layer was evaluated at a step of manufacturing the battery described above.

After the battery was fully charged, the battery was preserved for one month in an environment of 60° C., and a change ratio in swelling of the battery from a point in time before the battery was preserved was measured.

After the battery was fully charged, a temperature of the battery was raised up to 135° C. at 5° C./min and was held for one hour to confirm the presence or absence of thermal runaway of the battery.

After the battery was fully charged, a nail having a diameter (p) of 2.5 mm penetrated through a central portion of the battery at a piercing speed of 100 mm/sec under an environment of 23° C. to confirm the presence or absence of thermal runaway of the battery.

In a step of slitting the positive electrode, it was confirmed whether or not a part of an electrode active material layer on the positive electrode current collector was peeled off from a positive electrode current collector foil.

A battery after being assembled and before being first charged was disassembled, and it was confirmed whether or not a hole was formed in a positive electrode current collector of the innermost peripheral portion of the battery.

Table 1 represents configurations and evaluation results of the laminate type batteries of Examples 1-1-A to 1-11-A and Comparative Examples 1-1-A to 1-13-A.

TABLE 1

| | Type of external member | Melting point [° c.] of binder | Content [%] of binder | Content [%] of conductive agent | Type of separator | Gel electrolyte layer (containing fluororesin) | High temperature preservation swelling ratio [%] | Presence or absence of thermal runaway - Heating test | Presence or absence of thermal runaway - Nailing test | Positive electrode fall-off | Positive electrode crack |
|---|---|---|---|---|---|---|---|---|---|---|---|
| Example 1-9-A | Laminate film | 155 | 0.5 | 0.3 | Fluororesin coating | Absent | 10 | Absent | Absent | Absent | Absent |
| Example 1-10-A | | | | | Al$_2$O$_3$ coating | Absent | 10 | Absent | Absent | Absent | Absent |
| Example 1-11-A | | | | | No coating | Present | 9 | Absent | Absent | Absent | Absent |
| Example 1-1-A | | | 0.7 | 0.5 | Fluororesin coating | Absent | 9 | Absent | Absent | Absent | Absent |
| Example 1-2-A | | | | | Al$_2$O$_3$ coating | Absent | 9 | Absent | Absent | Absent | Absent |
| Example 1-3-A | | | | | No coating | Present | 8 | Absent | Absent | Absent | Absent |
| Example 1-4-A | | | 1.4 | 1.5 | Fluororesin coating | Absent | 8 | Absent | Absent | Absent | Absent |
| Example 1-5-A | | | | | No coating | Present | 7 | Absent | Absent | Absent | Absent |
| Example 1-6-A | | | 2.8 | 2.8 | Fluororesin coating | Absent | 6 | Absent | Absent | Absent | Absent |

TABLE 1-continued

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of thermal runaway | | Positive electrode fall-off | Positive electrode crack |
|---|---|---|---|---|---|---|---|---|---|---|---|
| | | | | | | | | Heating test | Nailing test | | |
| Example 1-7-A | | | | | Al$_2$O$_3$ coating | Absent | 5 | Absent | Absent | Absent | Absent |
| Example 1-8-A | | | | | No coating | Present | 5 | Absent | Absent | Absent | Absent |
| Comparative Example 1-13-A | Laminate film | 155 | 0.5 | 0.3 | No coating | Absent | 30 | Present | Present | Absent | Absent |
| Comparative Example 1-1-A | | | 0.7 | 0.5 | No coating | Absent | 30 | Present | Present | Absent | Absent |
| Comparative Example 1-2-A | | | 1.4 | 1.5 | No coating | Absent | 20 | Present | Present | Absent | Absent |
| Comparative Example 1-3-A | | | 2.8 | 2.9 | Fluororesin coating | Absent | Battery is not completed | | | Present | Present |
| Comparative Example 1-4-A | | | | 2.9 | Al$_2$O$_3$ coating | Absent | Battery is not completed | | | Present | Present |
| Comparative Example 1-5-A | | | | 2.9 | No coating | Absent | Battery is not completed | | | Present | Present |
| Comparative Example 1-6-A | | | | 3.0 | Fluororesin coating | Absent | 8 | Present | Present | Present | Absent |
| Comparative Example 1-7-A | | | | | Al$_2$O$_3$ coating | Absent | 8 | Present | Present | Present | Absent |
| Comparative Example 1-8-A | | | 2.9 | 3.0 | Fluororesin coating | Absent | Battery is not completed | | | Present | Present |
| Comparative Example 1-9-A | | | | | Al$_2$O$_3$ coating | Absent | Battery is not completed | | | Present | Present |
| Comparative Example 1-10-A | | | | | No coating | Absent | Battery is not completed | | | Present | Present |
| Comparative Example 1-11-A | | | | | No coating | Present | 7 | Present | Absent | Present | Absent |
| Comparative Example 1-12-A | | | 3.5 | 3.0 | No coating | Present | Battery is not completed | | | Absent | Present |

Table 2 represents configurations and evaluation results of the laminate type batteries of Examples 2-1-A to 2-11-A and Comparative Examples 2-1-A to 2-13-A.

TABLE 2

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of thermal runaway | | Positive electrode fall-off | Positive electrode crack |
|---|---|---|---|---|---|---|---|---|---|---|---|
| | | | | | | | | Heating test | Nailing test | | |
| Example 2-9-A | Laminate film | 166 | 0.5 | 0.3 | Fluororesin coating | Absent | 10 | Absent | Absent | Absent | Absent |
| Example 2-10-A | | | | | Al$_2$O$_3$ coating | Absent | 10 | Absent | Absent | Absent | Absent |
| Example 2-11-A | | | | | No coating | Present | 10 | Absent | Absent | Absent | Absent |
| Example 2-1-A | | | 0.7 | 0.5 | Fluororesin coating | Absent | 10 | Absent | Absent | Absent | Absent |

TABLE 2-continued

| | Type of external member | Melting point [°C] of binder | Content [%] of binder | Content [%] of conductive agent | Type of separator | Gel electrolyte layer (containing fluororesin) | High temperature preservation swelling ratio [%] | Presence or absence of thermal runaway — Heating test | Presence or absence of thermal runaway — Nailing test | Positive electrode fall-off | Positive electrode crack |
|---|---|---|---|---|---|---|---|---|---|---|---|
| Example 2-2-A | | | | | Al$_2$O$_3$ coating | Absent | 10 | Absent | Absent | Absent | Absent |
| Example 2-3-A | | | | | No coating | Present | 10 | Absent | Absent | Absent | Absent |
| Example 2-4-A | | | 1.4 | 1.3 | Fluororesin coating | Absent | 9 | Absent | Absent | Absent | Absent |
| Example 2-5-A | | | | | No coating | Present | 9 | Absent | Absent | Absent | Absent |
| Example 2-6-A | | | 2.8 | 2.8 | Fluororesin coating | Absent | 7 | Absent | Absent | Absent | Absent |
| Example 2-7-A | | | | | Al$_2$O$_3$ coating | Absent | 6 | Absent | Absent | Absent | Absent |
| Example 2-8-A | | | | | No coating | Present | 6 | Absent | Absent | Absent | Absent |
| Comparative Example 2-13-A | Laminate film | 166 | 0.5 | 0.3 | No coating | Absent | 35 | Present | Present | Absent | Absent |
| Comparative Example 2-1-A | | | 0.7 | 0.5 | No coating | Absent | 35 | Present | Present | Absent | Absent |
| Comparative Example 2-2-A | | | 1.4 | 1.5 | No coating | Absent | 32 | Present | Present | Absent | Absent |
| Comparative Example 2-3-A | | | 2.8 | 2.9 | Fluororesin coating | Absent | Battery is not completed | | | Present | Present |
| Comparative Example 2-4-A | | | | 2.9 | Al$_2$O$_3$ coating | Absent | Battery is not completed | | | Present | Present |
| Comparative Example 2-5-A | | | | 2.9 | No coating | Absent | Battery is not completed | | | Present | Present |
| Comparative Example 2-6-A | | | | 3.0 | Fluororesin coating | Absent | 10 | Present | Present | Present | Absent |
| Comparative Example 2-7-A | | | | | Al$_2$O$_3$ coating | Absent | 10 | Present | Present | Present | Absent |
| Comparative Example 2-8-A | | | 2.9 | 3.0 | Fluororesin coating | Absent | Battery is not completed | | | Present | Present |
| Comparative Example 2-9-A | | | | | Al$_2$O$_3$ coating | Absent | Battery is not completed | | | Present | Present |
| Comparative Example 2-10-A | | | | | No coating | Absent | Battery is not completed | | | Present | Present |
| Comparative Example 2-11-A | | | | | No coating | Present | 9 | Present | Absent | Present | Absent |
| Comparative Example 2-12-A | | | 3.5 | 3.0 | No coating | Present | Battery is not completed | | | Absent | Present |

Table 3 represents configurations and evaluation results of the laminate type batteries of Comparative Examples 3-1-A to 3-11-A and 4-1-A to 4-13-A.

TABLE 3

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of thermal runaway - Heating test | Presence or absence of thermal runaway - Nailing test | Positive electrode fall-off | Positive electrode crack |
|---|---|---|---|---|---|---|---|---|---|---|---|
| Comparative Example 3-9-A | Laminate film | 172 | 0.5 | 0.3 | Fluororesin coating | Absent | 25 | Present | Present | Absent | Absent |
| Comparative Example 3-10-A | | | | | Al$_2$O$_3$ coating | Absent | 25 | Present | Present | Absent | Absent |
| Comparative Example 3-11-A | | | | | No coating | Present | 24 | Present | Present | Absent | Absent |
| Comparative Example 3-1-A | | | 0.7 | 0.5 | Fluororesin coating | Absent | 25 | Present | Present | Absent | Absent |
| Comparative Example 3-2-A | | | | | Al$_2$O$_3$ coating | Absent | 25 | Present | Present | Absent | Absent |
| Comparative Example 3-3-A | | | | | No coating | Present | 23 | Present | Present | Absent | Absent |
| Comparative Example 3-4-A | | | 1.4 | 1.5 | Fluororesin coating | Absent | 23 | Present | Present | Absent | Absent |
| Comparative Example 3-5-A | | | | | No coating | Present | 22 | Present | Present | Absent | Absent |
| Comparative Example 3-6-A | | | 2.8 | 2.8 | Fluororesin coating | Absent | 22 | Present | Present | Absent | Absent |
| Comparative Example 3-7-A | | | | | Al$_2$O$_3$ coating | Absent | 22 | Present | Present | Absent | Absent |
| Comparative Example 3-8-A | | | | | No coating | Present | 20 | Present | Present | Absent | Absent |
| Comparative Example 4-13-A | Laminate film | 172 | 0.5 | 0.3 | No coating | Absent | 30 | Present | Present | Absent | Absent |
| Comparative Example 4-1-A | | | 0.7 | 0.5 | No coating | Absent | 41 | Present | Present | Absent | Absent |
| Comparative Example 4-2-A | | | 1.4 | 1.5 | No coating | Absent | 39 | Present | Present | Absent | Absent |
| Comparative Example 4-3-A | | | 2.8 | 2.9 | Fluororesin coating | Absent | Battery is not completed | | | Present | Present |
| Comparative Example 4-4-A | | | | 2.9 | Al$_2$O$_3$ coating | Absent | Battery is not completed | | | Present | Present |
| Comparative Example 4-5-A | | | | 2.9 | No coating | Absent | Battery is not completed | | | Present | Present |
| Comparative Example 4-6-A | | | | 3.0 | Fluororesin coating | Absent | 35 | Present | Present | Present | Absent |
| Comparative Example 4-7-A | | | | | Al$_2$O$_3$ coating | Absent | 32 | Present | Present | Present | Absent |
| Comparative Example 4-8-A | | | 2.9 | 3.0 | Fluororesin coating | Absent | Battery is not completed | | | Present | Present |
| Comparative Example 4-9-A | | | | | Al$_2$O$_3$ coating | Absent | Battery is not completed | | | Present | Present |
| Comparative Example 4-10-A | | | | | No coating | Absent | Battery is not completed | | | Present | Present |

TABLE 3-continued

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of thermal runaway Heating test | Presence or absence of thermal runaway Nailing test | Positive electrode fall-off | Positive electrode crack |
|---|---|---|---|---|---|---|---|---|---|---|---|
| Comparative Example 4-11-A | | | | | No coating | Present | 29 | Present | Present | Present | Absent |
| Comparative Example 4-12-A | | | 3.5 | 3.0 | No coating | Present | Battery is not completed | | | Absent | Present |

Table 4 represents configurations and evaluation results of the cylindrical batteries of Examples 1-1-B to 1-11-B and Comparative Examples 1-1-B to 1-13-B.

TABLE 4

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of cut-off of cut-off valve | Presence or absence of thermal runaway Heating test | Presence or absence of thermal runaway Nailing test | Positive electrode fall-off | Positive electrode crack |
|---|---|---|---|---|---|---|---|---|---|---|---|---|
| Example 1-9-B | Can | 155 | 0.5 | 0.3 | Fluororesin coating | Absent | 0 | Absent | Absent | Absent | Absent | Absent |
| Example 1-10-B | | | | | Al$_2$O$_3$ coating | Absent | 0 | Absent | Absent | Absent | Absent | Absent |
| Example 1-11-B | | | | | No coating | Present | 0 | Absent | Absent | Absent | Absent | Absent |
| Example 1-1-B | | | 0.7 | 0.5 | Fluororesin coating | Absent | 0 | Absent | Absent | Absent | Absent | Absent |
| Example 1-2-B | | | | | Al$_2$O$_3$ coating | Absent | 0 | Absent | Absent | Absent | Absent | Absent |
| Example 1-3-B | | | | | No coating | Present | 0 | Absent | Absent | Absent | Absent | Absent |
| Example 1-4-B | | | 1.4 | 1.5 | Fluororesin coating | Absent | 0 | Absent | Absent | Absent | Absent | Absent |
| Example 1-5-B | | | | | No coating | Present | 0 | Absent | Absent | Absent | Absent | Absent |
| Example 1-6-B | | | 2.8 | 2.8 | Fluororesin coating | Absent | 0 | Absent | Absent | Absent | Absent | Absent |
| Example 1-7-B | | | | | Al$_2$O$_3$ coating | Absent | 0 | Absent | Absent | Absent | Absent | Absent |
| Example 1-8-B | | | | | No coating | Present | 0 | Absent | Absent | Absent | Absent | Absent |
| Comparative Example 1-13-B | Can | 155 | 0.5 | 0.3 | No coating | Absent | 0 | Absent | Absent | Absent | Absent | Absent |
| Comparative Example 1-1-B | | | 0.7 | 0.5 | No coating | Absent | 0 | Absent | Absent | Absent | Absent | Absent |
| Comparative Example 1-2-B | | | 1.4 | 1.5 | No coating | Absent | 0 | Absent | Absent | Absent | Absent | Absent |
| Comparative Example 1-3-B | | | 2.8 | 2.9 | Fluororesin coating | Absent | 0 | Absent | Absent | Absent | Absent | Absent |
| Comparative Example 1-4-B | | | | 2.9 | Al$_2$O$_3$ coating | Absent | 0 | Absent | Absent | Absent | Absent | Absent |
| Comparative Example 1-5-B | | | | 2.9 | No coating | Absent | 0 | Absent | Absent | Absent | Absent | Absent |

TABLE 4-continued

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of cut-off valve | Presence or absence of thermal runaway | | Positive electrode fall-off | Positive electrode crack |
|---|---|---|---|---|---|---|---|---|---|---|---|---|
| | | | | | | | | | Heating test | Nailing test | | |
| Comparative Example 1-6-B | | | | 3.0 | Fluororesin coating | Absent | 0 | Absent | Absent | Absent | Absent | Absent |
| Comparative Example 1-7-B | | | | | Al$_2$O$_3$ coating | Absent | 0 | Absent | Absent | Absent | Absent | Absent |
| Comparative Example 1-8-B | | | 2.9 | 3.0 | Fluororesin coating | Absent | 0 | Absent | Absent | Absent | Absent | Absent |
| Comparative Example 1-9-B | | | | | Al$_2$O$_3$ coating | Absent | 0 | Absent | Absent | Absent | Absent | Absent |
| Comparative Example 1-10-B | | | | | No coating | Absent | 0 | Absent | Absent | Absent | Absent | Absent |
| Comparative Example 1-11-B | | | | | No coating | Present | 0 | Absent | Absent | Absent | Absent | Absent |
| Comparative Example 1-12-B | | | 3.5 | 3.0 | No coating | Present | 0 | Absent | Absent | Absent | Absent | Absent |

Table 5 represents configurations and evaluation results of the cylindrical batteries of Examples 2-1-B to 2-11-B and Comparative Examples 2-1-B to 2-13-B.

TABLE 5

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of cut-off valve | Presence or absence of thermal runaway | | Positive electrode fall-off | Positive electrode crack |
|---|---|---|---|---|---|---|---|---|---|---|---|---|
| | | | | | | | | | Heating test | Nailing test | | |
| Example 2-9-B | Can | 166 | 0.5 | 0.3 | Fluororesin coating | Absent | 0 | Absent | Absent | Absent | Absent | Absent |
| Example 2-10-B | | | | | Al$_2$O$_3$ coating | Absent | 0 | Absent | Absent | Absent | Absent | Absent |
| Example 2-11-B | | | | | No coating | Present | 0 | Absent | Absent | Absent | Absent | Absent |
| Example 2-1-B | | | 0.7 | 0.5 | Fluororesin coating | Absent | 0 | Absent | Absent | Absent | Absent | Absent |
| Example 2-2-B | | | | | Al$_2$O$_3$ coating | Absent | 0 | Absent | Absent | Absent | Absent | Absent |
| Example 2-3-B | | | | | No coating | Present | 0 | Absent | Absent | Absent | Absent | Absent |
| Example 2-4-B | | | 1.4 | 1.5 | Fluororesin coating | Absent | 0 | Absent | Absent | Absent | Absent | Absent |
| Example 2-5-B | | | | | No coating | Present | 0 | Absent | Absent | Absent | Absent | Absent |
| Example 2-6-B | | | 2.8 | 2.8 | Fluororesin coating | Absent | 0 | Absent | Absent | Absent | Absent | Absent |
| Example 2-7-B | | | | | Al$_2$O$_3$ coating | Absent | 0 | Absent | Absent | Absent | Absent | Absent |

TABLE 5-continued

| | Type of external member | Melting point [° C.] of binder | Content [%] of binder | Content [%] of conductive agent | Type of separater | Gel electrolyte layer (containing fluororesin) | High temperature preservation swelling ratio [%] | Presence or absence of cut-off of cut-off valve | Presence or absence of thermal runaway Heating test | Presence or absence of thermal runaway Nailing test | Positive electrode fall-off | Positive electrode crack |
|---|---|---|---|---|---|---|---|---|---|---|---|---|
| Example 2-8-B | | | | | No coating | Present | 0 | Absent | Absent | Absent | Absent | Absent |
| Comparative Example 2-13-B | Can | 166 | 0.5 | 0.3 | No coating | Absent | 0 | Absent | Absent | Absent | Absent | Absent |
| Comparative Example 2-1-B | | | 0.7 | 0.5 | No coating | Absent | 0 | Absent | Absent | Absent | Absent | Absent |
| Comparative Example 2-2-B | | | 1.4 | 1.5 | No coating | Absent | 0 | Absent | Absent | Absent | Absent | Absent |
| Comparative Example 2-3-B | | | 2.8 | 2.9 | Fluororesin coating | Absent | 0 | Absent | Absent | Absent | Absent | Absent |
| Comparative Example 2-4-B | | | | 2.9 | $Al_2O_3$ coating | Absent | 0 | Absent | Absent | Absent | Absent | Absent |
| Comparative Example 2-5-B | | | | 2.9 | No coating | Absent | 0 | Absent | Absent | Absent | Absent | Absent |
| Comparative Example 2-6-B | | | | 3.0 | Fluororesin coating | Absent | 0 | Absent | Absent | Absent | Absent | Absent |
| Comparative Example 2-7-B | | | | | $Al_2O_3$ coating | Absent | 0 | Absent | Absent | Absent | Absent | Absent |
| Comparative Example 2-8-B | | | 2.9 | 3.0 | Fluororesin coating | Absent | 0 | Absent | Absent | Absent | Absent | Absent |
| Comparative Example 2-9-B | | | | | $Al_2O_3$ coating | Absent | 0 | Absent | Absent | Absent | Absent | Absent |
| Comparative Example 2-10-B | | | | | No coating | Absent | 0 | Absent | Absent | Absent | Absent | Absent |
| Comparative Example 2-11-B | | | | | No coating | Present | 0 | Absent | Absent | Absent | Absent | Absent |
| Comparative Example 2-12-B | | | 3.5 | 3.0 | No coating | Present | 0 | Absent | Absent | Absent | Absent | Absent |

Table 6 represents configurations and evaluation results of the cylindrical batteries of Comparative Examples 3-1-B to 3-11-B and 4-1-B to 4-13-B.

TABLE 6

| | Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of cut-off of cut-off valve | Presence or absence of thermal runaway Heating test | Presence or absence of thermal runaway Nailing test | Positive electrode fall-off | Positive electrode crack |
|---|---|---|---|---|---|---|---|---|---|---|---|---|
| Comparative Example 3-9-B | Can | 172 | 0.5 | 0.3 | Fluororesin coating | Absent | 0 | Absent | Absent | Absent | Absent | Absent |
| Comparative Example 3-10-B | | | | | Al$_2$O$_3$ coating | Absent | 0 | Absent | Absent | Absent | Absent | Absent |
| Comparative Example 3-11-B | | | | | No coating | Present | 0 | Absent | Absent | Absent | Absent | Absent |
| Comparative Example 3-1-B | | | 0.7 | 0.5 | Fluororesin coating | Absent | 0 | Absent | Absent | Absent | Absent | Absent |
| Comparative Example 3-2-B | | | | | Al$_2$O$_3$ coating | Absent | 0 | Absent | Absent | Absent | Absent | Absent |
| Comparative Example 3-3-B | | | | | No coating | Present | 0 | Absent | Absent | Absent | Absent | Absent |
| Comparative Example 3-4-B | | | 1.4 | 1.5 | Fluororesin coating | Absent | 0 | Absent | Absent | Absent | Absent | Absent |
| Comparative Example 3-5-B | | | | | No coating | Present | 0 | Absent | Absent | Absent | Absent | Absent |
| Comparative Example 3-6-B | | | 2.8 | 2.8 | Fluororesin coating | Absent | 0 | Absent | Absent | Absent | Absent | Absent |
| Comparative Example 3-7-B | | | | | Al$_2$O$_3$ coating | Absent | 0 | Absent | Absent | Absent | Absent | Absent |
| Comparative Example 3-8-B | | | | | No coating | Present | 0 | Absent | Absent | Absent | Absent | Absent |
| Comparative Example 4-13-B | Can | 172 | 0.5 | 0.3 | No coating | Absent | 0 | Absent | Absent | Absent | Absent | Absent |
| Comparative Example 4-1-B | | | 0.7 | 0.5 | No coating | Absent | 0 | Absent | Absent | Absent | Absent | Absent |
| Comparative Example 4-2-B | | | 1.4 | 1.5 | No coating | Absent | 0 | Absent | Absent | Absent | Absent | Absent |
| Comparative Example 4-3-B | | | 2.8 | 2.9 | Fluororesin coating | Absent | 0 | Absent | Absent | Absent | Absent | Absent |
| Comparative Example 4-4-B | | | | 2.9 | Al$_2$O$_3$ coating | Absent | 0 | Absent | Absent | Absent | Absent | Absent |
| Comparative Example 4-5-B | | | | 2.9 | No coating | Absent | 0 | Absent | Absent | Absent | Absent | Absent |
| Comparative Example 4-6-B | | | | 3.0 | Fluororesin coating | Absent | 0 | Absent | Absent | Absent | Absent | Absent |
| Comparative Example 4-7-B | | | | | Al$_2$O$_3$ coating | Absent | 0 | Absent | Absent | Absent | Absent | Absent |
| Comparative Example 4-8-B | | | 2.9 | 3.0 | Fluororesin coating | Absent | 0 | Absent | Absent | Absent | Absent | Absent |
| Comparative Example 4-9-B | | | | | Al$_2$O$_3$ coating | Absent | 0 | Absent | Absent | Absent | Absent | Absent |
| Comparative Example 4-10-B | | | | | No coating | Absent | 0 | Absent | Absent | Absent | Absent | Absent |

TABLE 6-continued

| Type of external member | Melting point [° C.] of binder | Content [%] of binder | Content [%] of conductive agent | Type of separator | Gel electrolyte layer (containing fluororesin) | High temperature preservation swelling ratio [%] | Presence or absence of cut-off valve | Presence or absence of thermal runaway — Heating test | Nailing test | Positive electrode fall-off | Positive electrode crack |
|---|---|---|---|---|---|---|---|---|---|---|---|
| Comparative Example 4-11-B | | | | No coating | Present | 0 | Absent | Absent | Absent | Absent | Absent |
| Comparative Example 4-12-B | | 3.5 | 3.0 | No coating | Present | 0 | Absent | Absent | Absent | Absent | Absent |

The following can be seen from Tables 1 to 6.

Comparing the evaluation results of Example 1-1-A to 1-11-A, Example 2-1-A to 2-11-A, and Comparative Example 3-1-A to 3-11-A with one another, in the laminate type battery in which the melting point of the positive electrode binder is 166° C. or less, the high temperature preservation swelling ratio is 10% or less, and the thermal runaway is not generated in the heating test and the nailing test. On the other hand, in the laminate type battery in which the melting point of the positive electrode binder is 172° C., the high temperature preservation swelling ratio is 20% or more, which is significantly high, and the thermal runaway is generated in the heating test and the nailing test. Therefore, it is preferable that the melting point of the positive electrode binder is preferably 166° C. or less.

Comparing the evaluation results of Examples 1-1-A to 1-11-A and Comparative Examples 1-1-A to 1-13-A with each other, in the laminate type battery in which (a) a content of the binder in the positive electrode active material layer is 0.5% by mass or more and 2.8% by mass or less, (b) a content of the conductive agent in the positive electrode active material layer is 0.3% by mass or more and 2.8% by mass or less, (c) one or both of a fluororesin-containing layer (a fluororesin-coated layer or a gel electrolyte layer) and metal oxide particles is/are provided between the positive electrode and the separator, a high temperature preservation swelling ratio is 10% or less, the thermal runaway is not generated in the heating test and the nailing test, the positive electrode crack does not occur at the time of assembling the battery, and the fall-off of the positive electrode active material layer at the time of slitting the positive electrode is not observed. On the other hand, in the laminate type battery that does not have any one of the above configurations (a), (b), and (c), a defect occurs in at least one of the high temperature preservation swelling ratio, the heating test, the nailing test, and the fall-off of the positive electrode active material layer, or the positive electrode crack occurs, and thus, the battery is not completed.

The above discussion regarding the evaluation results of Examples 1-1-A to 1-11-A and Comparative Examples 1-1-A to 1-13-A can be said to be applied to the evaluation results of the laminate type batteries of Examples 2-1-A to 2-11-A and Comparative Examples 2-1-A to 2-13-A.

In the laminate type batteries of Comparative Examples 3-1-A to 3-11-A and Comparative Examples 4-1-A to 4-13-A, since the melting point of the positive electrode binder is 172° C., a defect occurs in at least one of the high temperature preservation swelling ratio, the heating test, the nailing test, the positive electrode crack, and the fall-off of the positive electrode active material, or the battery is not completed, regardless of whether or not the laminate type battery has all of the above configurations (a), (b), and (c).

In the cylindrical batteries of Examples 1-1-B to 1-11-B and 2-1-B to 2-11-B and Comparative Examples 1-1-B to 1-13-B, 2-1-B to 2-13-B, 3-1-B to 3-11-B, and 4-1-B to 4-13-B, there was no problem in evaluations of all of the high temperature preservation swelling ratio, the heating test, the nailing test, the positive electrode crack, and the positive electrode active material. The reason is not clear, but is considered that in the cylindrical battery, a container is formed of a metal, and a heat dissipation property at the time of the heating test and the nailing test is thus improved, so that the thermal runaway is not generated. Further, a possibility that a difference in an original winding structure will have an influence on these results is considered. With respect to the swelling of the battery at the time of high temperature preservation of the battery, in the cylindrical battery, it is considered that the container is formed of a metal, so that the battery is not swollen by a gas generated in the container. With regard to the positive electrode crack, it is considered that since the battery is not flat, stress on the positive electrode at the time of winding the positive electrode is small, so that the positive electrode crack does not occur.

The embodiment, modified examples thereof, and Examples of the present technology have been specifically described hereinabove, but the present technology is not limited to the embodiment, modified examples thereof, and Examples described above, and can be variously modified based on the technical idea of the present technology.

For example, the configurations, the methods, the processes, the shapes, the materials, the numerical values, and the like, mentioned in the embodiment, modified examples thereof, and Examples described above are only examples, and different configurations, methods, processes, and shapes, materials, numerical values, and the like, may be used if necessary. Further, chemical formulas of the compounds and the like are representative, and are not limited to the mentioned valences and the like as long as they are general names of the same compounds.

Further, the configurations, methods, processes, shapes, materials, numerical values, and the like, of the embodiments, modified examples thereof, and Examples described above can be combined with one another without departing from the scope of the present technology.

The present technology is described below in further detail according to an embodiment.

(1)
A battery including:
a positive electrode;
a negative electrode;
a separator; and
an intermediate layer that is provided between the positive electrode and the separator and contains at least one of a fluororesin and a particle,
in which
the positive electrode has a positive electrode active material layer containing a fluorine-based binder having a melting point of 166° C. or less, and
a content of the fluorine-based binder in the positive electrode active material layer is 0.7% by mass or more and 2.8% by mass or less.

(2)
The battery according to (1), in which
the positive electrode active material layer further contains a conductive agent, and
a content of the conductive agent in the positive electrode active material layer is 0.5% by mass or more and 2.8% by mass or less.

(3)
The battery according to (1) or (2), in which the fluororesin holds an electrolytic solution.

(4)
The battery according to (3), in which the intermediate layer is a gel electrolyte layer.

(5)
The battery according to any one of (1) to (4), in which the fluorine-based binder is polyvinylidene fluoride.

(6)
The battery according to any one of (1) to (5), in which the particle is an inorganic particle.

(7)
The battery according to (6), in which the inorganic particle contains a metal oxide.

(8)
The battery according to (7), in which the metal oxide includes at least one of aluminum oxide, boehmite, magnesium oxide, titanium oxide, zirconium oxide, silicon oxide, yttrium oxide, and zinc oxide.

(9)
The battery according to any one of (1) to (8), in which the positive electrode, the negative electrode, the intermediate layer, and the separator are wound in a flat shape.

(10)
The battery according to any one of (1) to (9), further including an exterior member that accommodates the positive electrode, the negative electrode, the intermediate layer, and the separator and has a film shape.

(11)
A positive electrode including:
a positive electrode active material layer that contains a fluorine-based binder having a melting point of 166° C. or less; and
a surface layer that is provided on a surface of the positive electrode active material layer and contains at least one of a fluororesin and a particle,
in which a content of the fluorine-based binder in the positive electrode active material layer is 0.7% by mass or more and 2.8% by mass or less.

(12)
A battery pack including:
the battery according to any one of (1) to (10); and
a control unit that controls the battery.

(13)
An electronic device including the battery according to any one of (1) to (11), in which the electronic device receives power supplied from the battery.

(14)
An electric motor vehicle including:
the battery according to any one of (1) to (10);
a conversion device that receives power supplied from the battery and converts the power into a drive force of the vehicle; and
a control device that performs information processing related to vehicle control based on information regarding the battery.

(15)
A power storage device including the battery according to any one of (11) to (10), in which the power storage device supplies power to an electronic device connected to the battery.

(16)
A power system including the battery according to any one of (1) to (10), in which the power system receives power supplied from the battery.

(1A)
A battery including:
a positive electrode;
a negative electrode;
a separator; and
an intermediate layer that is provided between the positive electrode and the separator and contains at least one of a fluororesin and a particle,
in which
the positive electrode has a positive electrode active material layer containing a fluorine-based binder having a melting point of 166° C. or less, and
a content of the fluorine-based binder in the positive electrode active material layer is 0.5% by mass or more and 2.8% by mass or less.

(2A)
The battery according to (1A), in which
the positive electrode active material layer further contains a conductive agent, and
a content of the conductive agent in the positive electrode active material layer is 0.3% by mass or more and 2.8% by mass or less.

(3A)
The battery according to (1A) or (2A), in which the fluororesin holds an electrolytic solution.

(4A)
The battery according to (3A), in which the intermediate layer is a gel electrolyte layer.

(5A)
The battery according to any one of (1A) to (4A), in which the fluorine-based binder is polyvinylidene fluoride.

(6A)
The battery according to any one of (1A) to (5A), in which the particle is an inorganic particle.

(7A)
The battery according to (6A), in which the inorganic particle contains a metal oxide.

(8A)
The battery according to (7A), in which the metal oxide includes at least one of aluminum oxide, boehmite, magnesium oxide, titanium oxide, zirconium oxide, silicon oxide, yttrium oxide, and zinc oxide.

(9A)
The battery according to any one of (1A) to (8A), in which the positive electrode, the negative electrode, the intermediate layer, and the separator are wound in a flat shape.

(10A)
The battery according to any one of (1A) to (9A), further including an exterior member that accommodates the positive electrode, the negative electrode, the intermediate layer, and the separator and has a film shape.

(11A)
A positive electrode including:
a positive electrode active material layer that contains a fluorine-based binder having a melting point of 166° C. or less; and
a surface layer that is provided on a surface of the positive electrode active material layer and contains at least one of a fluororesin and a particle,
in which a content of the fluorine-based binder in the positive electrode active material layer is 0.5% by mass or more and 2.8% by mass or less.

(12A)
A battery pack including:
the battery according to any one of (1A) to (10A); and
a control unit that controls the battery.

(13A)
An electronic device including the battery according to any one of (1A) to (11A), in which the electronic device receives power supplied from the battery.

(14A)
An electric motor vehicle including:
the battery according to any one of (1A) to (10A);
a conversion device that receives power supplied from the battery and converts the power into a drive force of the vehicle; and
a control device that performs information processing related to vehicle control based on information regarding the battery.

(15A)
A power storage device including the battery according to any one of (1A) to (10A), in which the power storage device supplies power to an electronic device connected to the battery.

(16A)
A power system including the battery according to any one of (1A) to (10A), in which the power system receives power supplied from the battery.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A lithium secondary battery comprising:
a positive electrode;
a negative electrode;
a separator including a base material and a surface layer provided to the base material, the surface layer including a flouroresin and a particle,
wherein
the positive electrode has a positive electrode active material layer including a fluorine-based binder having a melting point of 166° C. or less, and
a content of the fluorine-based binder in the positive electrode active material layer is from 0.5% by mass to 1.4% by mass,
wherein the positive electrode active material layer further includes a conductive agent, and a content of the conductive agent in the positive electrode active material layer is from 0.3% by mass to 1.5% by mass,
wherein the positive electrode active material layer includes a positive electrode active material including a lithium composite oxide having a layered rock salt type structure, and
wherein the fluororesin includes a vinylidene fluoride-hexafluoropropylene copolymer,
wherein the fluororesin contained in the surface layer of the separator is fibrillated to have a three-dimensional network structure in which fibrils are continuously connected to each other, and
wherein a plurality of the particles are held by being supported in the fluororesin having the three-dimensional network structure.

2. The lithium secondary battery according to claim 1, wherein the fluororesin is configured to hold an electrolytic solution.

3. The lithium secondary battery according to claim 1, wherein the fluorine-based binder includes polyvinylidene fluoride.

4. The lithium secondary battery according to claim 1, wherein the particle includes an inorganic particle.

5. The lithium secondary battery according to claim 4, wherein the inorganic particle includes a metal oxide.

6. The lithium secondary battery according to claim 5, wherein the metal oxide includes one or more of aluminum oxide, boehmite, magnesium oxide, titanium oxide, zirconium oxide, silicon oxide, yttrium oxide, and zinc oxide.

7. The lithium secondary battery according to claim 1, wherein the positive electrode, the negative electrode, and the separator are wound in a flat shape.

8. The lithium secondary battery according to claim 1, further comprising an exterior member configured to accommodate the positive electrode, the negative electrode, and the separator, and the exterior member has a film shape.

9. A battery pack comprising:
the lithium secondary battery according to claim 1; and
a control controller configured to control the lithium secondary battery.

10. An electronic device comprising the lithium secondary battery according to claim 1, wherein the electronic device is configured to receive power supplied from the lithium secondary battery.

11. An electric motor vehicle comprising:
the lithium secondary battery according to claim 1;
a converter configured to receive power supplied from the lithium secondary battery and convert the power into a drive force of the vehicle; and
a controller configured to perform information processing related to vehicle control based on information regarding the lithium secondary battery.

12. A power storage device comprising the lithium secondary battery according to claim 1, wherein the power storage device is configured to supply power to an electronic device connected to the lithium secondary battery.

13. A power system comprising the lithium secondary battery according to claim 1, wherein the power system is configured to receive power supplied from the lithium secondary battery.

14. A lithium secondary battery comprising:
a positive electrode;
a negative electrode;
a separator including a base material and a surface layer provided to the base material, the surface layer including a flouroresin and a particle,
wherein
the positive electrode has a positive electrode active material layer including a fluorine-based binder having a melting point of 166° C. or less, and
a content of the fluorine-based binder in the positive electrode active material layer is from 0.7% by mass to 1.4% by mass,
wherein the positive electrode active material layer further includes a conductive agent, and a content of the conductive agent in the positive electrode active material layer is from 0.3% by mass to 1.5% by mass,
wherein the positive electrode active material layer includes a positive electrode active material including a lithium composite oxide having a layered rock salt type structure, and
wherein the fluororesin includes a vinylidene fluoride-hexafluoropropylene copolymer,
wherein the fluororesin contained in the surface layer of the separator is fibrillated to have a three-dimensional network structure in which fibrils are continuously connected to each other, and
wherein a plurality of the particles are held by being supported in the fluororesin having the three-dimensional network structure.

* * * * *